(12) United States Patent
Iizuka et al.

(10) Patent No.: US 9,193,817 B2
(45) Date of Patent: Nov. 24, 2015

(54) SEMI-CURED PRODUCT, CURED PRODUCT AND METHOD OF MANUFACTURING SAME, OPTICAL COMPONENT, CURABLE RESIN COMPOSITION

(71) Applicant: FUJIFILM Corporation, Minato-ku, Tokyo (JP)

(72) Inventors: Yuusuke Iizuka, Ashigarakami-gun (JP); Tatsuhiko Obayashi, Ashigarakami-gun (JP); Naoyuki Morooka, Ashigarakami-gun (JP); Takayasu Nagai, Ashigarakami-gun (JP); Ayumi Someya, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/498,384

(22) Filed: Sep. 26, 2014

(65) Prior Publication Data

US 2015/0018445 A1    Jan. 15, 2015

Related U.S. Application Data

(63) Continuation of application No. PCT/JP2013/057394, filed on Mar. 15, 2013.

(30) Foreign Application Priority Data

Mar. 29, 2012 (JP) .................................. 2012-078046

(51) Int. Cl.
| | |
|---|---|
| C08F 2/50 | (2006.01) |
| C08F 2/46 | (2006.01) |
| C08G 61/04 | (2006.01) |
| C08F 222/14 | (2006.01) |
| C08F 220/30 | (2006.01) |
| C08F 265/04 | (2006.01) |
| C08F 290/12 | (2006.01) |
| G02B 1/04 | (2006.01) |
| C08F 220/68 | (2006.01) |
| C08F 265/06 | (2006.01) |
| C08F 212/08 | (2006.01) |
| C08F 212/32 | (2006.01) |
| C08F 220/40 | (2006.01) |
| C08F 212/36 | (2006.01) |

(52) U.S. Cl.
CPC ............. *C08F 222/14* (2013.01); *C08F 220/30* (2013.01); *C08F 220/68* (2013.01); *C08F 265/04* (2013.01); *C08F 265/06* (2013.01); *C08F 290/12* (2013.01); *G02B 1/04* (2013.01); *G02B 1/041* (2013.01); *C08F 212/08* (2013.01); *C08F 212/32* (2013.01); *C08F 212/36* (2013.01); *C08F 220/40* (2013.01); *C08F 2222/145* (2013.01)

(58) Field of Classification Search
USPC .................. 522/33, 6, 71, 189, 184, 1; 520/1
See application file for complete search history.

(56) References Cited

U.S. PATENT DOCUMENTS

| | | | |
|---|---|---|---|
| 2010/0297588 A1 | 11/2010 | Kalgutkar et al. | |
| 2011/0144279 A1* | 6/2011 | Uchida et al. | 525/301 |
| 2012/0010322 A1* | 1/2012 | Moszner et al. | 523/116 |
| 2013/0237630 A1* | 9/2013 | Morooka et al. | 522/182 |

FOREIGN PATENT DOCUMENTS

| | | | |
|---|---|---|---|
| JP | 2002-012684 A | | 1/2002 |
| JP | 2003-286316 A | | 10/2003 |
| JP | 2006-299194 | * | 11/2006 |
| JP | 2008-024637 | * | 2/2008 |
| JP | 2011-053518 A | | 3/2011 |
| JP | 2011-153179 A | | 8/2011 |
| WO | 2012/047071 | * | 5/2012 |

OTHER PUBLICATIONS

Nodono et al, JP 2006-299194 Machine Translation, Nov. 2, 2006.*
Hosomi et al, JP 2008-024637 Machine Translation, Feb. 7, 2008.*
Mochizuki et al, WO 2012/057071 Machine Translation, May 3, 2012.*
International Search Report of PCT/JP2013/057394 dated Apr. 16, 2013 [PCT/ISA/210].
International Preliminary Report on Patentability dated Oct. 9, 2014 from the International Bureau of WIPO in corresponding International Application No. PCT/JP2013/057394.
Written Opinion dated Apr. 16, 2013 from the International Bureau of WIPO in corresponding International Application No. PCT/JP2013/057394.
Office Action dated Aug. 25, 2015 from the Japanese Patent Office in counterpart Japanese Application No. 2012-078046.

* cited by examiner

*Primary Examiner* — Ling Choi
*Assistant Examiner* — Jessica E Whiteley
(74) *Attorney, Agent, or Firm* — Sughrue Mion, PLLC

(57) ABSTRACT

A curable resin composition comprising a (meth)acrylate monomer having an aromatic ring, a non-conjugated vinylidene group-containing compound represented by the general formula below, and a thermal or a photo-radical polymerization initiator makes it possible to produce a cured product with minimized occurrence of burring during molding and high product yield after molding. The cured product has good heat coloration resistance and low Abbe's number. $R^{11}$, $R^{12}$, $R^{15}$, and $R^{16}$ represent a substituent and A represents an atomic group necessary for forming a cyclic structure.

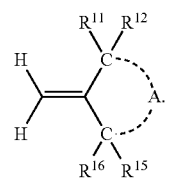

18 Claims, No Drawings

SEMI-CURED PRODUCT, CURED PRODUCT AND METHOD OF MANUFACTURING SAME, OPTICAL COMPONENT, CURABLE RESIN COMPOSITION

CROSS-REFERENCE TO RELATED APPLICATIONS

This application is a continuation application of International Application No. PCT/JP2013/057394, filed Mar. 15, 2013, which in turn claims the benefit of priority from Japanese Application No. 2012-078046, filed Mar. 29, 2012, the disclosures of which Applications are incorporated by reference herein in their entirety.

BACKGROUND OF THE INVENTION

1. Field of the Invention

The present invention relates to a semi-cured product, a cured product and a method of manufacturing the same, an optical component, and a curable resin composition.

2. Background Art

An imaging module has been used for a camera, a video camera, a mobile phone with a camera, a video phone, or a door phone with a camera. In recent years, particularly miniaturization has been demanded in an optical system used for the imaging module. When the optical system is miniaturized, chromatic aberration of the optical system may become a big problem.

In the related art, glass which is used as a material of the optical system can realize various optical characteristics to be demanded and has excellent environmental resistance, but there is a problem in that workability thereof is degraded. In contrast, a synthetic resin is low in cost when compared to a glass material and has excellent workability, but there is a problem in that heat resistance thereof is degraded when compared to the glass material.

A method of changing characteristics after curing by adding various additives to a photo-curable resin composition has been known. For example, Patent Literature 1 discloses an aspect of using a curable resin composition which has 0.5 parts by mass to 30 parts by mass of a monofunctional acryl, a difunctional acryl, and a terpene compound with respect to acryls, and to which a photo-polymerization initiator is added as a resin composition for coating of an alicyclic structure-containing polymer (COP) molded body and a COP protection coating material. The same literature discloses that a resin obtained by polymerizing a terpene compound for improving adhesion with COP can be used. However, the above-described composition has insufficient heat resistance.

Patent Literature 2 discloses an example of adding an alicyclic radical polymerizable group-containing compound (A), a photo-polymerization initiator and a thermal polymerization initiator (B), and a difunctional radical polymerizable compound (A') in Example 6, and performing photo-polymerization and thermal polymerization in this order. The same literature discloses that a fine shaping property of a curable resin composition can be resolved with such a configuration. However, the above-described composition has an insufficient shaping property from a viewpoint of use for an optical component such as a heat-resistant lens.

In recent years, it has been known that chromatic aberration can be corrected by decreasing a high refractive index and the Abbe's number of a material composition to have a high dispersion property (for example, Patent Literatures 3 and 4). Patent Literature 3 discloses that an optical element having a high refractive index, a high dispersion property, and excellent heat resistance can be obtained from a material composition containing a compound of acryloyloxyalkyl carbazole or methacryloyloxyalkyl carbazole and a polymerizable compound having at least one structure selected from a biphenyl structure, a bisphenol A structure, a fluorene structure, and a naphthalene structure in a molecule. Patent Literature 4 discloses that a composite optical element formed of only a resin which is effective for decreasing the chromatic aberration and other aberrations can be obtained from a composition containing a compound of carbazole having a vinyl group, a vinylidene group, a vinylene group, an acryloyl group, and a methacryloyl group as a polymerizable functional group; a polymerizable group which has one to three polymerizable functional groups and whose functional groups are a vinyl group, an acrylic group, or a methacrylic group; and a polymerization initiator.

CITATION LIST

Patent Literatures

Patent Literature 1: JP-A-2002-12684
Patent Literature 2: JP-A-2003-286316
Patent Literature 3: JP-A-2011-153179
Patent Literature 4: JP-A-2011-53518

SUMMARY OF INVENTION

When a lens is manufactured using the composition disclosed in Patent Literature 4, the present inventors found a problem in that burrs occur at the time of molding and the yield thereof is degraded after molding. Further, the Abbe's number can be decreased when a (meth)acrylate monomer having an aromatic ring is used, but the present inventors found that the (meth)acrylate monomer having an aromatic ring is likely to be colored when heated.

An object of the present invention is to resolve the above-described problems. That is, a task to be solved by the present invention is to provide a curable resin composition in which the occurrence of burr at the time of molding is suppressed, the yield after molding is high, heat coloration resistance thereof are excellent, and a cured product with a low Abbe's number can be manufactured.

As a result of intensive research done by the present inventors, they found that the above-described problems can be solved by mixing a specific non-conjugated vinylidene group-containing compound which is not disclosed in Patent Literature 4 with (meth)acrylate monomers having aromatic rings. It is not intended that the present invention adheres to any theories, but deformability of a semi-cured product and a heat resistance necessary for an optical component can be provided so that the above-described problems can be solved by controlling a three-dimensional structure through chain transfer in polymerization of non-conjugated vinylidene group-containing compound monomers. That is, the present inventors found that the above-described problems can be solved by the following structures, thereby completing the present invention.

[1] A curable resin composition containing a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth) acrylate monomer,

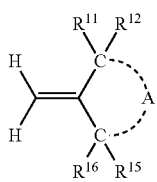

wherein $R^{11}$, $R^{12}$, $R^{15}$, and $R^{16}$ each independently represent a substituent and A represents an atomic group necessary for forming a cyclic structure.

[2] It is preferable that the curable resin composition according to [1] have a content ratio of aromatic rings with respect to entire monomers contained in the curable resin composition that is represented by the following formula (I) of 25% by mass or more, $$X^1 = \sum_{k=1}^{n^1} (x_k^1 \times y_k^1) \quad \text{Formula (I)}$$

wherein $X^1$ represents the content ratio of aromatic rings with respect to the entire monomers contained in the curable resin composition, $x^1_k$ represents a mass content ratio of aromatic rings of each monomer species contained in the curable resin composition calculated by the following formula (I'), $y^1_k$ represents a mass ratio of each monomer species contained in the curable resin composition with respect to the total mass of the entire monomers contained in the curable resin composition, and $n^1$ represents the number of monomer species contained in the curable resin composition, $x^1_k$=(Molecular weight of aromatic ring moiety contained in a monomer species)/(Molecular weight of the monomer species)×100% wherein $x^1_k$ represents a content ratio of aromatic rings of the monomer species.

[3] It is preferable that the curable resin composition according to [2] have a content ratio of aromatic rings of 30% by mass or more represented by the formula (I).

[4] The curable resin composition according to any one of [1] to [3] have a content ratio $X^2$ of aromatic rings of 25% by mass or more with respect to the entire (meth)acrylic monomers contained in the curable resin composition that is represented by the following formula (II), $$X^2 = \sum_{k=1}^{n^2} (x_k^2 \times y_k^2) \quad \text{Formula (II)}$$

wherein $X^2$ represents a content ratio of aromatic rings with respect to the entire (meth)acrylic monomers, $x^2_k$ represents a mass content ratio of aromatic rings of each (meth)acrylate monomer species calculated by the following formula (II'), $y^2_k$ represents a mass ratio of each (meth)acrylate monomer species with respect to the total mass of the entire (meth) acrylate monomers, and $n^2$ represents the total number of (meth)acrylic monomer species contained in the curable resin composition, Formula (II')

$x^2_k$=(Molecular weight of aromatic ring moiety contained in a (meth)acrylate monomer species)/(Molecular weight of the (meth)acrylate monomer species)×100% wherein $x^2_k$ represents the content ratio of aromatic rings of the (meth)acrylate monomer species.

[5] It is preferable that the (meth)acrylate monomers having an aromatic rings be represented by the following general formula (2) in the curable resin composition according to any one of [1] to [4],

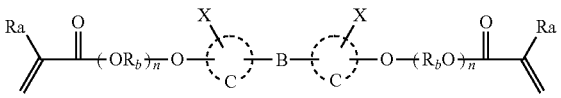

wherein rings C each independently represent an aromatic ring having 6 to 14 carbon atoms, Ra's each independently represent a hydrogen atom or an alkyl group, Rb's each independently represent an alkylene group, and X represents a hydrogen atom or a substituent, B represents a difunctional group represented by single bond,

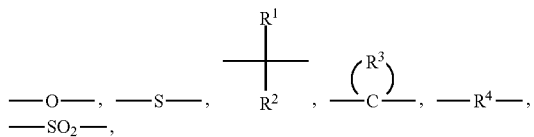

here, $R^1$ and $R^2$ each independently represent a hydrogen atom, a methyl group, an ethyl group, a phenyl group, or a diphenyl group, $R^3$ represents an alkylene group, a cycloalkylene group, or a diphenyl group which have 3 to 24 carbon atoms, $R^4$ represents an alkylene group or a cycloalkylene group which have 1 to 12 carbon atoms, and n's each independently represent an integer of 0 to 14.

[6] It is preferable that the (meth)acrylate monomers having an aromatic ring include polyfunctional (meth)acrylate monomers and monofunctional (meth)acrylate monomers, and the (meth)acrylate monomers having an aromatic ring contain 40% by mass to 90% by mass of the polyfunctional (meth)acrylate monomers with respect to the total mass of the polyfunctional (meth)acrylate monomers and the monofunctional (meth)acrylate monomers in the curable resin composition according to any one of [1] to [5].

[7] It is preferable that B be represented by

in the curable resin composition according to [5] or [6], (here, $R^3$ represents an alkylene group, a cycloalkylene group, or a diphenyl group which have 3 to 12 carbon atoms).

[8] It is preferable that the curable resin composition according to any one of [1] to [7] contain 0.5% by mass to 30% by mass of the non-conjugated vinylidene group-containing compound with respect to the curable resin composition.

[9] It is preferable that the non-conjugated vinylidene group-containing compound include an alkenyl group in addition to a vinylidene group in the curable resin composition according to any one of [1] to [8].

[10] It is preferable that the curable resin composition according to any one of [1] to [9] further contain a polymer having a polymerizable group in a side chain thereof.

[11] It is preferable that the curable resin composition according to [10] contain 5% by mass to 50% by mass of a polymer having the polymerizable group in the side chain thereof with respect to the total mass of the curable resin composition.

[12] It is preferable that the curable resin composition according to any one of [1] to [11] contain a photo-radical polymerization initiator.

[13] It is preferable that the curable resin composition according to any one of [1] to [12] contain a thermal radical polymerization initiator and a photo-radical polymerization initiator.

[14] A method of manufacturing a semi-cured product including performing at least one of photo-irradiation and heating with respect to the curable resin composition according to any one of [1] to [13] and forming a semi-cured product having a complex viscosity of $10^5$ mPa·s to $10^8$ mPa·s at a frequency of 10 Hz at 25° C.

[15] It is preferable that the method of manufacturing a semi-cured product according to [14] include a step of performing photo-irradiation on the curable resin composition and the curable resin composition contain a photo-radical polymerization initiator.

[16] A semi-cured product which is manufactured by the method of manufacturing a semi-cured product according to [14] or [15].

[17] A method of manufacturing a cured product, including a thermal polymerization step of pressing and deforming a semi-cured product manufactured by the method of manufacturing a semi-cured product according to [14] or [15] by putting the semi-cured product in a molding die and performing heating and thermal polymerization on the semi-cured product to obtain a cured product.

[18] A cured product which is manufactured by the method of manufacturing a cured product according to [17].

[19] An optical component using the cured product according to [18].

According to the present invention, it is possible to provide a curable resin composition in which the occurrence of burr at the time of molding is suppressed, the yield after molding is high, and a cured product with good heat coloration resistance and a low Abbe's number can be manufactured.

DESCRIPTION OF EMBODIMENTS

Hereinafter, a curable resin composition of the present invention, a semi-cured product and a cured product of the present invention, a method of manufacturing the same, and materials to be used for the same will be described in detail.

The description of the constituent elements described below is made based on typical embodiments of the present invention, but the present invention is not limited thereto. In this description, the numerical range expressed by the wording "a number to another number" in the present specification means a range that falls between the former number indicating the lower limit of the range and the latter number indicating the upper limit thereof.

[Curable Resin Composition]

A curable resin composition of the present invention contains a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer.

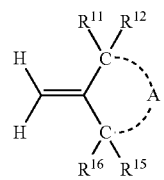

General Formula (1)

In the general formula (1), $R^{11}$, $R^{12}$, $R^{15}$, and $R^{16}$ each independently represent a substituent and A represents an atomic group necessary for forming a cyclic structure.

With such a structure, a cured product in which the occurrence of burr at the time of molding is suppressed, the yield after molding is high, heat coloration resistance thereof are excellent, and the Abbe's number is low can be manufactured by the curable resin composition of the present invention.

<(Meth)Acrylate Monomer Having Aromatic Ring and Other (Meth)Acrylate Monomers>

The curable resin composition of the present invention contains a (meth)acrylate monomer having an aromatic ring. Here, the fact that an optical component with a low Abbe's number can be obtained using a (meth)acrylate monomer having an aromatic ring is described on pages 174 to 177 of "*Controlling Refractive Index of Transparent Polymer* (Chemical Quarterly Review No. 39)" edited by the Chemical Society of Japan, and specifically, since the monomer having an aromatic ring has an absorption of nearly 250 nm to 300 nm, the Abbe's number thereof becomes decreased when compared to a case in which an aliphatic monomer having an absorption of nearly 120 nm to 200 nm is used.

Here, the curable resin composition of the present invention may contain other (meth)acrylate monomers in addition to the (meth)acrylate monomer having an aromatic ring within the range not departing from the scope of the present invention.

In addition, in the present specification, "(meth)acrylate" expresses acrylate and methacrylate; "(meth)acryl" expresses acryl and methacryl; and "(meth)acryloyl" expresses acryloyl and methacryloyl. Further, in the present specification, "monomer" in Chinese characters and "monomer" in Katakana have the same definition as each other. The monomer of the present specification is differentiated from oligomer and polymer and is a compound having a weight average molecular weight of 1000 or less.

(Content Ratio $X^1$ of Aromatic Rings with Respect to Entire Monomers)

It is preferable that the content ratio of the aromatic rings with respect to the entire monomers represented by the following formula (I) be 25% by mass or more in the curable resin composition of the present invention.

$$X^1 = \sum_{k=1}^{n^1} (x_k^1 \times y_k^1)$$

Formula (I)

In the formula (I), $X^1$ represents the content ratio of aromatic rings with respect to the entire monomers contained in the curable resin composition, $x_k^1$ represents a content ratio (mass ratio) of aromatic rings of each monomer species contained in the cured resin composition calculated by the following formula (I'), $y_k^1$ represents a ratio (mass ratio) of each monomer species contained in the cured resin composition with respect to the total mass of the entire monomers contained in the curable resin composition, and $n^1$ represents the number of monomer species contained in the cured resin composition.

$x^1_k$=(Molecular weight of aromatic ring moiety contained in a monomer species)/(Molecular weight of the monomer species)×100%   Formula (I')

In the formula (I'), $x^1_k$ represents the content ratio of aromatic rings of the monomer species.

In the curable resin composition of the present invention, the content ratio $X^1$ of the aromatic rings represented by the formula (I) above is preferably 30% by mass or more, more preferably 40% by mass or more, and particularly preferably 50% by mass or more.

Meanwhile, the upper limit of the content ratio $X^1$ of the aromatic rings represented by the formula (I) above is not particularly limited, but the upper limit thereof is preferably 90% by mass or less and more preferably 80% by mass or less from a viewpoint of storage stability of deposition or the like.

(Content Ratio $X^2$ of Aromatic Rings with Respect to Entire (Meth)Acrylic Monomers)

In the curable resin composition of the present invention, it is preferable that the content ratio $X^2$ of aromatic rings with respect to the entire (meth)acrylic monomers that is represented by the following formula (II) be 25% by mass or more.

$$X^2 = \sum_{k=1}^{n^2} (x^2_k \times y^2_k)$$   Formula (II)

In the formula (II), $X^2$ represents the content ratio of aromatic rings with respect to the entire (meth)acrylic monomers, $x^2_k$ represents a content ratio (mass ratio) of aromatic rings of each (meth)acrylate monomer species calculated by the following formula (II'), $y^2_k$ represents a ratio (mass ratio) of each (meth)acrylate monomer species with respect to the total mass of the entire (meth)acrylate monomers, and $n^2$ represents the total number of (meth)acrylic monomer species contained in the cured resin composition.

$x^2_k$=(Molecular weight of aromatic ring moiety contained in a (meth)acrylate monomer species)/ (Molecular weight of the (meth)acrylate monomer species)×100%   Formula (II')

In the formula (II'), $x^2_k$ represents the content ratio of aromatic rings of the (meth)acrylate monomer species.

In the curable resin composition of the present invention, the content ratio $X^2$ of the aromatic rings represented by the formula (II) above is preferably 30% by mass or more, more preferably 40% by mass or more, and particularly preferably 50% by mass or more.

Meanwhile, the upper limit of the content ratio $X^2$ of the aromatic rings represented by the formula (II) above is not particularly limited, but the upper limit thereof is preferably 90% by mass or less and more preferably 80% by mass or less from a viewpoint of storage stability of deposition or the like.

(Preferred Structure of (Meth)Acrylate Monomer)

The (meth)acrylate monomer used for the present invention can be divided into a polyfunctional (meth)acrylate monomer and a monofunctional (meth)acrylate monomer. Here, the polyfunctional (meth)acrylate monomer is a (meth)acrylate monomer having multiple functional groups, and the monofunctional (meth)acrylate monomer is a (meth)acrylate monomer having one functional group. Further, in the present specification, the "functional group of (meth)acrylate monomers" means an ethylenic unsaturated bond that participates in polymerization.

(1) Polyfunctional (Meth)Acrylate Monomer

Examples of the polyfunctional (meth)acrylate monomer used for the present invention include the following: tricyclodecanedimethanol di(meth)acrylate, diethylene glycol monoethyl ether (meth)acrylate, dimethyloldicyclopentane di(meth)acrylate, di(meth)acrylated isocyanurate, 1,3-butylene glycol di(meth)acrylate, 1,4-butanediol di(meth)acrylate, ethylene oxide (hereinafter, referred to as "EO")-modified 1,6-hexanediol di(meth)acrylate, epichlorohydrin (hereinafter, referred to as "ECH")-modified 1,6-hexanediol di(meth)acrylate, allyloxypolyethylene glycol (meth)acrylate, 1,9-nonanediol di(meth)acrylate, EO-modified bisphenol A di(meth)acrylate, propylene oxide (hereinafter, referred to as "PO")-modified bisphenol A di(meth)acrylate, ECH-modified bisphenol A di(meth)acrylate, EO-modified bisphenol F di(meth)acrylate, ECH-modified hexahydrophthalic acid di(meth)acrylate, hydroxypivalic acid neopentylglycol di(meth)acrylate, neopentylglycol di(meth)acrylate, EO-modified neopentylglycol di(meth)acrylate, PO-modified neopentylglycol di(meth)acrylate, stearic acid-modified pentaerythritol di(meth)acrylate, ECH-modified phthalic acid di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentylglycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, ECH-modified glycerol tri(meth)acrylate, EO-modified glycerol tri(meth)acrylate, PO-modified glycerol tri(meth)acrylate, pentaerythritol tri(meth)acrylate, EO-modified phosphoric acid tri(meth)acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl) isocyanurate, dipentaerythritol hexa(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxytetra(meth)acrylate, and pentaerythritol tetra(meth)acrylate.

Hereinafter, a polyfunctional (meth)acrylate monomer having an aromatic ring used for the curable resin composition of the present invention and other polyfunctional (meth)acrylate monomers which are preferable to be used in combination with the polyfunctional (meth)acrylate monomer having an aromatic ring will be described in order.

(1-1) Polyfunctional (Meth)Acrylate Monomer Having Aromatic Ring

As the polyfunctional (meth)acrylate monomer having an aromatic ring used for the present invention, it is preferable to use a divalent (meth)acrylate monomer having an aromatic ring and it is preferable that the (meth)acrylate monomer having an aromatic ring be represented by the following general formula (2).

General Formula (2)

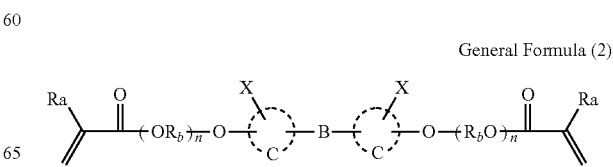

In the formula (2), rings C each independently represent an aromatic ring having 6 to 14 carbon atoms, Ra's each independently represent a hydrogen atom or an alkyl group, Rb's each independently represent an alkylene group, and X represents a hydrogen atom or a substituent, B represents a difunctional group represented by single bond,

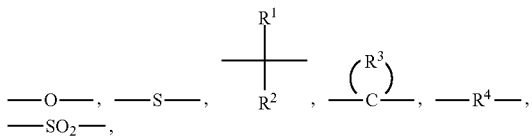

here, $R^1$ and $R^2$ each independently represent a hydrogen atom, a methyl group, an ethyl group, a phenyl group, or a diphenyl group, $R^3$ represents an alkylene group, a cycloalkylene group, or a diphenyl group which have 3 to 24 carbon atoms, $R^4$ represents an alkylene group or a cycloalkylene group which have 1 to 12 carbon atoms, and n's each independently represent an integer of 0 to 14.

In the general formula (2), the rings C each independently preferably represent an aromatic ring having to 10 carbon atoms and more preferably represent an aromatic ring having 6 carbon atoms.

In the general formula (2), Ra's each independently preferably represent a hydrogen atom or a methyl group and more preferably represent a hydrogen atom.

In the general formula (2), Rb's each independently represent an alkylene group having 1 to 10 carbon atoms, more preferably represent an alkylene group having 1 to 4 carbon atoms, and particularly preferably represent an ethylene group.

In the general formula (2), X represents a hydrogen atom or a substituent and preferably represents a hydrogen atom. As the substituents which can be represented by X, for example, substituents which are the same as $R^1$ and $R^2$ described below can be exemplified.

In the general formula (2), in the difunctional group represented by B, $R^1$ and $R^2$ each independently represent a hydrogen atom, a methyl group, an ethyl group, a phenyl group, or a diphenyl group (also referred to as a biphenyl group), preferably represent a methyl group or a phenyl group, and more preferably represent a methyl group.

$R^3$ represents an alkylene group, a cycloalkylene group, or a diphenylene group which have 3 to 24 carbon atoms, preferably represents an alkylene group having 5 to 18 carbon atoms, a cycloalkylene group or a diphenyl group which have 6 to 12 carbon atoms, more preferably represents a diphenylene group, and particularly preferably represents a diphenylene group (that is, a fluorene skeleton) in which two o-phenylene groups are bonded to each other.

$R^4$ represents an alkylene group having 1 to 6 carbon atoms, preferably represents a cycloalkylene group having 1 to 6 carbon atoms, and more preferably represents a cycloalkylene group having 1 to 6 carbon atoms.

In the general formula (2), among the difunctional groups represented by B, B is preferably represented by

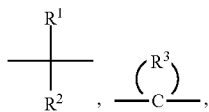

B is more preferably represented by

in the curable resin composition of the present invention.

In the general formula (2), n's each independently preferably represent an integer of 1 to 10, more preferably represent an integer of 1 to 4, and particularly preferably represent 1.

As the polyfunctional (meth)acrylate monomer having an aromatic ring, for example, the following can be used. Examples thereof include EO-modified bisphenol A di(meth)acrylate, PO-modified bisphenol A di(meth)acrylate, ECH-modified bisphenol A di(meth)acrylate, EO-modified bisphenol F di(meth)acrylate, and ECH-modified phthalic acid di(meth)acrylate.

Among these, it is preferable to use an EO-modified bisphenol A di(meth)acrylate, PO-modified bisphenol A di(meth)acrylate, and EO-modified bisphenol F di(meth)acrylate satisfying the above-described general formula (2), more preferably EO-modified bisphenol A di(meth)acrylate and PO-modified bisphenol A di(meth)acrylate, and particularly preferably EO-modified bisphenol A di(meth)acrylate.

(1-2) Other Polyfunctional (Meth)Acrylate Monomers

On the other hand, as other polyfunctional (meth)acrylate monomers, it is preferable to use a polyfunctional (meth)acrylate monomer having an aliphatic structure, more preferably a divalent (meth)acrylate monomer having an aliphatic structure, and still more preferably a polyfunctional (meth)acrylate monomer represented by the following general formula (4).

General Formula (4)

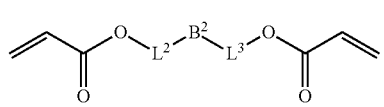

In the general formula (4), $L^2$ and $L^3$ each independently represent a single bond or a divalent linking group, and $B^2$ represents a divalent alicyclic group.

$L^2$ and $L^3$ each independently preferably represent a single bond or a divalent alkylene group, more preferably a single bond or a methylene group, and particularly preferably a methylene group.

$B^2$ preferably represents a divalent alicyclic group having 5 to 15 carbon atoms, more preferably a divalent alicyclic group having 7 to 15 carbon atoms, and particularly preferably a divalent alicyclic group having 8 to 12 carbon atoms. $B^1$ preferably represents a condensed ring to which two or more rings are condensed and more preferably a condensed ring to which two or three rings are condensed. Further, $B^2$ is preferably free from a double bond in the alicyclic structure.

Among these, tricyclodecane dimethanol di(meth)acrylate is particularly preferable and tricyclodecane dimethanol diacrylate is more particularly preferable.

(2) Monofunctional (Meth)Acrylate Monomer

Examples of the monofunctional (meth)acrylate monomer used for the present invention include the following: adamantyl (meth)acrylates such as 1-adamantyl (meth)acrylate and the like; norbornyl (meth)acrylates such as isobornyl (meth)acrylate and the like; tricyclodecane (meth)acrylates such as tricyclo[5,2,1,0$^{2,6}$]dec-8-yl acrylate and the like; 2-ethyl-2- butylpropanediol (meth)acrylate, 2-ethylhexyl (meth)acrylate, 2-ethylhexylcarbitol (meth)acrylate, 2-hydroxybutyl (meth)acrylate, 2-hydroxyethyl (meth)acrylate, 2-hydroxypropyl (meth)acrylate, 2-methoxyethyl (meth)acrylate, 3-methoxybutyl (meth)acrylate, 4-hydroxybutyl (meth)acrylate, benzyl (meth)acrylate, 1- or 2-naphthyl (meth)acrylate, butanediol mono(meth)acrylate, butoxyethyl (meth)acrylate, butyl (meth)acrylate, cetyl (meth)acrylate, EO-modified cresol (meth)acrylate, dipropylene glycol (meth)acrylate, ethoxylated phenyl (meth)acrylate, ethyl (meth)acrylate, isoamyl (meth)acrylate, isobutyl (meth)acrylate, isooctyl (meth)acrylate, cyclohexyl (meth)acrylate, dicyclopentanyl (meth)acrylate, dicyclopentanyloxyethyl (meth)acrylate, isomyristyl (meth)acrylate, lauryl (meth)acrylate, methoxydipropylene glycol (meth)acrylate, methoxytripropylene glycol (meth)acrylate, methoxypolyethylene glycol (meth)acrylate, methoxytriethylene glycol (meth)acrylate, methyl (meth)acrylate, neopentyl glycol benzoate (meth)acrylate, nonylphenoxypolyethylene glycol (meth)acrylate, nonylphenoxypolypropylene glycol (meth)acrylate, octyl (meth)acrylate, paracumylphenoxyethylene glycol (meth)acrylate, ECH-modified phenoxy (meth)acrylate, phenoxyethyl (meth)acrylate, phenoxydiethylene glycol (meth)acrylate, phenoxyhexaethylene glycol (meth)acrylate, phenoxytetraethylene glycol (meth)acrylate, stearyl (meth)acrylate, EO-modified succinic acid (meth)acrylate, tert-butyl (meth)acrylate, tribromophenyl (meth)acrylate, EO-modified tribromophenyl (meth)acrylate, and tridodecyl (meth)acrylate.

Hereinafter, a monofunctional (meth)acrylate monomer having an aromatic ring used for the curable resin composition of the present invention and other monofunctional (meth)acrylate monomers which are preferable to be used in combination with the monofunctional (meth)acrylate monomer having an aromatic ring will be described in order.

(2-1) Monofunctional (Meth)Acrylate Monomer Having Aromatic Ring

Preferred examples of the monofunctional (meth)acrylate monomer having an aromatic ring used for the present invention include the following: benzyl (meth)acrylate, 1- or 2-naphthyl (meth)acrylate, EO cresol (meth)acrylate, ethoxylated phenyl (meth)acrylate, nonylphenoxypolyethylene glycol (meth)acrylate, nonylphenoxypolypropylene glycol (meth)acrylate, paracumylphenoxyethylene glycol (meth)acrylate, ECH-modified phenoxy (meth)acrylate, phenoxyethyl (meth)acrylate, phenoxydiethylene glycol (meth)acrylate, phenoxyhexaethylene glycol (meth)acrylate, phenoxytetraethylene glycol (meth)acrylate, tribromophenyl (meth)acrylate, EO-modified tribromophenyl (meth)acrylate, O-phenylphenoxy (meth)acrylate, and O-phenylphenol EO-modified (meth)acrylate.

Among these, phenoxyethyl (meth)acrylate, O-phenylphenol (meth)acrylate, and O-phenylphenol EO-modified (meth)acrylate are more preferable and O-phenylphenol (meth)acrylate and phenoxyethyl (meth)acrylate are particularly preferable.

(2-2) Other Monofunctional (Meth)Acrylate Monomers

On the other hand, as other monofunctional (meth)acrylate monomers, it is preferable to use a monofunctional (meth)acrylate monomer having an alicyclic structure and more preferable to use a monofunctional (meth)acrylate monomer represented by the following general formula (3).

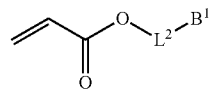

General Formula (3)

In the general formula (3), $L^1$ represents a single bond or a divalent linking group and $B^1$ represents a monovalent alicyclic group.

$L^1$ is preferably a single bond or a divalent alkylene group, or more preferably a single bond or a methylene group, and particularly preferably a single bond.

$B^1$ is preferably a monovalent alicyclic group having to 15 carbon atoms, more preferably a monovalent alicyclic group having 7 to 15 carbon atoms, and particularly preferably a monovalent alicyclic group having 8 to 12 carbon atoms. $B^1$ is preferably a condensed ring to which two or more rings are condensed and more preferably a condensed ring to which two or three rings are condensed. Further, $B^1$ is preferably free from a double bond in the alicyclic structure.

Among these, 1-adamantyl (meth)acrylate, isobornyl (meth)acrylate, and tricycle[5,2,1,0$^{2,6}$]dec-8-yl (meth)acrylate are more preferable and 1-adamantyl (meth)acrylate is particularly preferable.

(Composition Ratio)

The (meth)acrylate monomer is preferably a mixture of a polyfunctional (meth)acrylate monomer or a polyfunctional acrylate monomer and a monofunctional (meth)acrylate monomer.

Among these, the (meth)acrylate monomer is more preferably a mixture of a polyfunctional (meth)acrylate monomer and a monofunctional (meth)acrylate monomer from a viewpoint of improving heat coloration resistance of a cured product after thermal polymerization described below.

Further, in the curable resin composition of the present invention, the (meth)acrylate monomer having an aromatic ring is preferably formed of a polyfunctional (meth)acrylate monomer and a monofunctional (meth)acrylate monomer, and preferably contains 40% by mass to 90% by mass of the polyfunctional (meth)acrylate monomer and particularly preferably 50% by mass to 80% by mass of the polyfunctional (meth)acrylate with respect to the total amount of the polyfunctional (meth)acrylate monomer and the monofunctional (meth)acrylate monomer.

Hereinafter, specific examples of the (meth)acrylate monomer preferably used for the present invention will be described, but the present invention is not particularly limited to the compounds described below.

Polyfunctional (meth) acrylic monomer

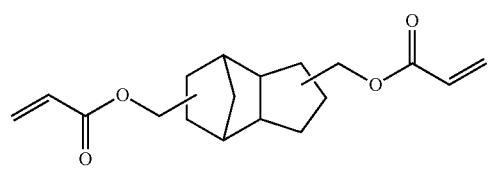

(Aa-1)

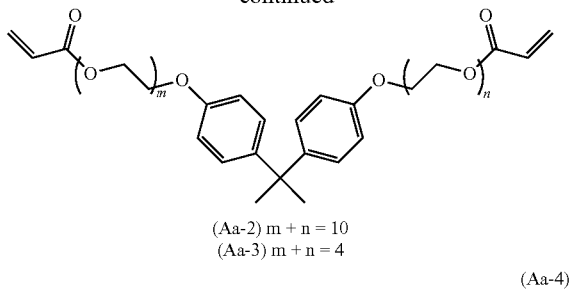

(Aa-2) m + n = 10
(Aa-3) m + n = 4

(Aa-4)

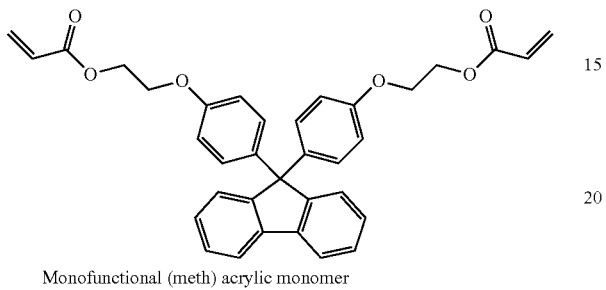

Monofunctional (meth) acrylic monomer (Ab-1)

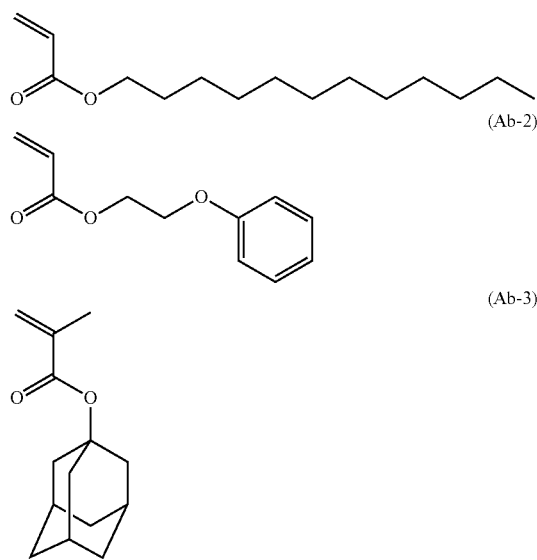

(Ab-2)

(Ab-3)

(Molecular Weight)

The molecular weight of the (meth)acrylate monomer preferably used for the present invention is preferably 100 to 500, more preferably 150 to 400, and particularly preferably 200 to 400.

(Obtaining Method)

A method of obtaining these (meth)acrylate monomers is not particularly limited, and these can be obtained in a commercial way or may be manufactured through synthesis.

In a case where these can be obtained in a commercial way, for example, compounds Aa-1 (A-DCP (trade name), manufactured by Shin-Nakamura Chemical Co., Ltd.), Aa-2 (light acrylate BP-4EA (trade name), manufactured by KYOE-ISHA Chemical Co., Ltd.), Aa-3 (light acrylate BP-10EA (trade name), manufactured by KYOEISHA Chemical Co., Ltd.), and the like can be preferably used.

In a case where these are manufactured through synthesis, the method of manufacturing the (meth)acrylate monomer is not particularly limited and the synthesis can be performed by a known method.

The curable resin composition preferably contains 50% by mass to 95% by mass of the (meth)acrylate monomer, more preferably 55% by mass to 90% by mass, and particularly preferably 60% by mass to 90% by mass with respect to the total amount of the curable resin composition.

<Non-Conjugated Vinylidene Group-Containing Compound>

The curable resin composition of the present invention contains the non-conjugated vinylidene group-containing compound represented by the following general formula (1).

General Formula (1)

In the general formula (1), $R^{11}$, $R^{12}$, $R^{15}$, and $R^{16}$ each independently represent a substituent and A represents an atomic group necessary for forming a cyclic structure.

Here, the non-conjugated vinylidene group-containing compound does not contain a (meth)acrylate monomer.

The viscosity of the semi-cured product after photo- or thermal polymerization can be controlled to be within a specific range and the heat resistance and the yield of the cured product obtained when the thermal polymerization is performed on the semi-cured product in the method of manufacturing a cured product of the present invention described below can be improved using the curable resin composition containing such a non-conjugated vinylidene group-containing compound.

In the general formula (1), the substituent represented by $R^{11}$, $R^{12}$, $R^{15}$, and $R^{16}$ is not particularly limited, and examples thereof include the following substituents: a hydrogen atom, a halogen atom, a halogenated alkyl group, an alkyl group, an alkenyl group, an acyl group, a hydroxyl group, a hydroxylalkyl group, an aromatic ring group, a heteroaromatic ring group, and an alicyclic group.

Among these, $R^{11}$, $R^{12}$, $R^{15}$, and $R^{16}$ are each independently preferably a substituent formed of a hydrogen atom, an oxygen atom, and a carbon atom and more preferably a substituent formed of a hydrogen atom and a carbon atom. Specifically, $R^{11}$, $R^{12}$, $R^{15}$, and $R^{16}$ are respectively a hydrogen atom, an alkyl group, and an alkenyl group, and more preferably a hydrogen atom, an alkyl group having 1 to 5 carbon atoms, and an alkenyl group having 2 to 5 carbon atoms.

Further, in regard to the expression of the group (atomic group) in the present specification, the expression without mentioning substitution or unsubstitution means that a group without a substituent and a group with a substituent are both included. For example, an "alkyl group" may be an alkyl group (unsubstituted alkyl group) without a substituent or an alkyl group (substituted alkyl group) with a substituent.

A ring formed of $R^{11}$, $R^{12}$, $R^{15}$, and $R^{16}$ may be an aromatic ring, a hetero aromatic ring, or a non-aromatic ring. Among these, a ring formed of $R^{11}$, $R^{12}$, $R^{15}$, and $R^{16}$ is preferably a non-aromatic ring and more preferably a non-aromatic hydrocarbon ring. Further, a ring formed of $R^{11}$, $R^{12}$, $R^{15}$, and $R^{16}$ may include substituents therein. As examples of the substituents, an alkyl group having 1 to 5 carbon atoms is preferable and a methyl group, an ethyl group, an n-propyl group, and an isopropyl group are more preferable. In addition, in a case where a ring formed of $R^{11}$, $R^{12}$, $R^{15}$, and $R^{16}$ includes substituents therein, the substituents may be bonded to each other to form a condensed ring.

In addition, a ring formed of $R^{11}$, $R^{12}$, $R^{15}$, and $R^{16}$ in the non-conjugated vinylidene group-containing compound may be one or plural. Further, in a case where the ring formed of $R^{11}$, $R^{12}$, $R^{15}$, and $R^{16}$ is plural, rings may be plural rings which are separated from each other, a condensed ring to which plural rings separated from each other are condensed, or a condensed ring to which substituents are bonded when one ring further includes substituents as described above. Among these, a ring formed of $R^{11}$, $R^{12}$, $R^{15}$, and $R^{16}$ is more preferably a condensed ring to which plural rings are condensed and particularly preferably a condensed ring to which substituents are bonded when one ring further includes substituents. In addition, in the present specification, an embodiment in which two rings are spiro-condensed similarly to the compounds of the specific examples described below is included in condensed rings.

Further, in a carbon atom to which $R^{11}$ and $R^{12}$ are bonded and a carbon atom to which $R^{15}$ and $R^{16}$ are bonded, one carbon atom is preferably an asymmetric carbon atom.

Further, between a set of $R^{11}$ and $R^{12}$ and a set $R^{15}$ and $R^{16}$, at least one of two substituents in only one set is preferably a hydrogen atom and both of two substituents in only one set are preferably hydrogen atoms.

$R^{11}$ and $R^{12}$ each independently represent a hydrogen atom or a hydrocarbon group having 1 to 5 carbon atoms, and it is preferable that the hydrocarbon group having 1 to 5 carbon atoms do not form a ring. Between $R^{11}$ and $R^{12}$, only one of these represents a hydrogen atom or a hydrocarbon group having 1 to 5 carbon atoms, and the hydrocarbon group having 1 to 5 carbon atoms preferably does not form a ring.

In the general formula (1), A represents an atomic group necessary for forming a cyclic structure, and the cyclic structure is not particularly limited and a known cyclic structure may be used. Examples of the cyclic structure include an alicyclic ring (non-aromatic hydrocarbon ring), an aromatic ring, a heterocyclic ring, and a lactone ring containing —CO—.

Among these, A is preferably an atomic group which contains a carbon atom linked to A of the general formula (1) and a carbon atom constituting a non-conjugated vinylidene group and is necessary for forming an alicyclic ring having 4 to 10 carbon atoms, and particularly preferably an atomic group which contains a carbon atom linked to A of the general formula (1) and a carbon atom constituting a non-conjugated vinylidene group and is necessary for forming an alicyclic ring having 5 to 9 carbon atoms. The alicyclic ring may include further substituents and the examples of the preferred substituents are the same as the substituents which may be included in the ring formed of $R^{11}$, $R^{12}$, $R^{15}$, and $R^{16}$. Further, A may be an unsaturated alicyclic ring or a saturated alicyclic ring, but it is preferable that A have at least one unsaturated bond as the non-conjugated vinylidene group-containing compound. In addition, A may form a condensed ring and a substituent represented by $R^{11}$, $R^{12}$, $R^{15}$, and $R^{16}$.

In the present invention, in the general formula (1), $R^{11}$, $R^{12}$, $R^{15}$, and $R^{16}$ each independently represent a substituent formed of only a hydrogen atom and a carbon atom and A is particularly preferably an alicyclic ring structure (non-aromatic hydrocarbon).

In the present invention, it is preferable that the non-conjugated vinylidene group-containing compound include another alkenyl group in addition to a vinylidene group (non-conjugated vinylidene group). The position of the vinylidene group other than the non-conjugated vinylidene group included in the non-conjugated vinylidene group-containing compound is not particularly limited. In the non-conjugated vinylidene group-containing compound, it is preferable that the vinylidene group other than the non-conjugated vinylidene group be positioned in the ring formed by $R^{11}$, $R^{12}$, $R^{15}$, and $R^{16}$. That is, it is particularly preferable that the ring formed by $R^{11}$, $R^{12}$, $R^{15}$, and $R^{16}$ contain at least one unsaturated hydrocarbon ring and particularly preferable that the ring formed by $R^{11}$, $R^{12}$, $R^{15}$, and $R^{16}$ contain an unsaturated hydrocarbon ring having only one of at least one double bond.

Hereinafter, specific examples of the non-conjugated vinylidene group-containing compound preferably used for the present invention will be described, but the present invention is not limited to the compounds described below.

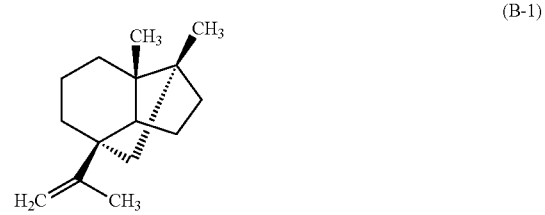

(B-1)

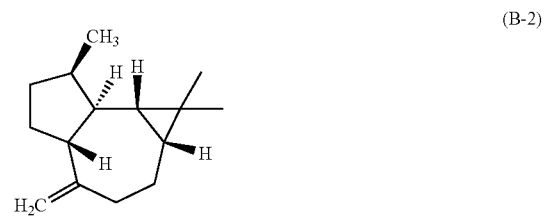

(B-2)

(B-3)

(B-4)

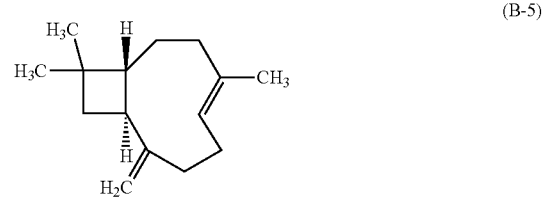

(B-5)

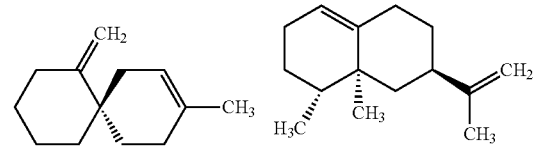

-continued

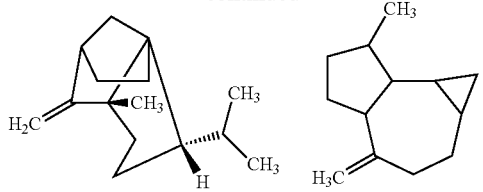

(Molecular Weight)

The molecular weight of the non-conjugated vinylidene group-containing compound is preferably 100 to 400, more preferably 120 to 350, and particularly preferably 130 to 300.

(Obtaining Method)

A method of obtaining these non-conjugated vinylidene group-containing compounds is not particularly limited, and these can be obtained in a commercial way or may be manufactured through synthesis.

In a case where these can be obtained in a commercial way, for example, β-caryophyllene (manufactured by Tokyo Chemical Industry Co., Ltd.) of a compound (B-5) or the like can be preferably used.

In a case where these are manufactured through synthesis, the method of manufacturing the non-conjugated vinylidene group-containing compound is not particularly limited and the synthesis can be performed by a known method. For example, in a case where β-caryophyllene which can be preferably used for the present invention among the non-conjugated vinylidene group-containing compound is synthesized, the synthesis can be performed using methods described in J. Am. Chem. Soc. 85, 362 (1964), and Tetrahedron Lette., 24, 1885 (1983).

In the present invention, the cured resin composition preferably contains 0.5% by mass to 30% by mass of the non-conjugated vinylidene group-containing compound, more preferably 1% by mass to 25% by mass of the non-conjugated vinylidene group-containing compound, and 2% by mass to 20% by mass of the non-conjugated vinylidene group-containing compound with respect to the total amount of the cured resin composition.

<Photo-Radical Polymerization Initiator>

It is preferable that the curable resin composition of the present invention contain the photo-radical polymerization initiator. The photo-radical polymerization initiator is not particularly limited, and a known photo-radical polymerization initiator can be used.

Specific examples of the photo-radical polymerization initiator include the following compounds: bis(2,6-dimethoxybenzoyl)-2,4,4-trimethylpentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropane-1-one, 1-hydroxycyclohexyl phenyl ketone, 1-(4-isopropylphenyl)-2-hydroxy-2-methylpropane-1-one, 1,2-diphenylethane-dione, methylphenyl glyoxylate, 1-[4-(2-hydroxyethoxy)-phenyl]-2-hydroxy-2-methyl-1-propionyl)1-one, 2-hydroxy-1-{4-[4-(2-hydroxy-2-methyl-propionyl)-benzyl]phenyl}-2-methyl-propane-1-one, 2,2-dimethoxy-1,2-diphenylethane-1-one, 2-methyl-1-(4-methylthiophenyl)-2-morpholinopropane-1-one, 2-benzyl-2-dimethylamino-1-(4-morpholinophenyl)-butanone-1,2,4,6-trimethylbenzoyldiphenyl-phosphine oxide, and bis(2,4,6-trimethylbenzoyl)-phenylphosphine oxide.

Among these, IRGACURE 184 (1-hydroxycyclohexyl phenyl ketone, manufactured by BASF Corporation), 1-[4-(2-hydroxyethoxy)-phenyl]-2-hydroxy-2-methyl-1-propane-1-one, 2-methyl-1-(4-methylthiophenyl)-2-morpholinopropane-1-one, and 2,2-dimethoxy-1,2-diphenylethane-1-one are preferred for the photo-radical polymerization initiator in the invention.

Not particularly limited, the addition amount of the photo-radical polymerization initiator in the curable resin composition is preferably from 0.01% by mass to 5% by mass, more preferably from 0.05% by mass to 1.0% by mass, and particularly preferably from 0.05% by mass to 0.5% by mass with respect to the total amount of the curable resin composition (preferably, the total of the (meth)acrylate monomer, the non-conjugated vinylidene group-containing compound, and the polymer having a polymerizable group in the side chain thereof to be described below).

<Thermal Radical Polymerization Initiator>

It is preferable that the curable resin composition of the present invention contain a thermal radical polymerization initiator. Since such a thermal radical polymerization initiator is previously added to the curable resin composition, a cured product having high heat resistance of the present invention can be easily manufactured with excellent moldabililty and productivity through thermal polymerization using the semi-cured product of the present invention.

Specific examples of thermal radical polymerization initiator include the following compounds: 1,1-di(t-hexylperoxy)cyclohexane, 1,1-di(t-butylperoxy)cyclohexane, 2,2-di (4,4-di-(t-butylperoxy)cyclohexyl)propane, t-hexylperoxyisopropyl monocarbonate, t-butylperoxy 3,5,5-trimethylhexanoate, t-butylperoxy laurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, and 2,3-dimethyl-2,3-diphenylbutane.

Above all, in the present invention, it is preferable to use a hydroperoxide-based thermal radical polymerization initiator having a hydroperoxide group in the molecule as the thermal radical polymerization initiator, and more preferable to use at least one of hydroperoxide-based thermal radical polymerization initiator having a hydroperoxide group in the molecule and at least one of a non-hydroperoxide-based thermal radical polymerization initiator with no hydroperoxide group in the molecule.

In the present invention, perbutyl O (t-butylperoxy 2-ethylhexanoate, manufactured by NOF Corporation) is preferred as the non-hydroperoxide-based thermal radical polymerization initiator, and percumyl H (cumene hydroperoxide, manufactured by NOF Corporation) is preferred as the hydroperoxide-based thermal radical polymerization initiator.

The reason why use of the hydroperoxide-based thermal radical polymerization initiator having a hydroperoxide group in the molecule is preferred as the thermal radical polymerization initiator is because the hydroperoxide-based thermal radical polymerization has an effect of promoting chain transfer during polymerization of non-conjugated vinylidene group-containing compound monomer by which the three-dimensional structure of the resulting polymer can be more favorably controlled and the semi-cured product can be given good deformability. In a case where such a hydroperoxide-based thermal radical polymerization initiator is used, the temperature at which thermal radical polymerization is initiated is generally high, and therefore in such a case, it is more preferable that the hydroperoxide-based thermal radical polymerization initiator is used along with a non-hydroperoxide-based thermal radical polymerization initiator having a low thermal polymerization initiation temperature.

Not particularly limited, the amount of the thermal radical polymerization initiator added to the curable resin composition is preferably from 0.01% by mass to 5.0% by mass, more preferably from 0.1% by mass to 4.0% by mass, and particularly preferably from 0.3% by mass to 3.0% by mass with respect to the total of the (meth)acrylate monomer, the non-conjugated vinylidene group-containing compound, and the polymer having a polymerizable group described below in the side chain thereof.

<Polymer Having Polymerizable Group in Side Chain>

In a case where the curable resin composition is directly placed in a molding die before photo-irradiation and/or heating, it is preferable that the curable resin composition of the present invention contain a polymer having a polymerizable group in the side chain thereof, from a viewpoint that the viscosity of the curable resin composition before photo-irradiation and/or heating can be controlled to be high so as to prevent the composition from being leaked away through the mold clearance.

The polymer having a polymerizable group in the side chain thereof may be a homopolymer or a copolymer. In the case of the copolymer, at least one copolymerization component may have a polymerizable group in the side chain thereof.

Hereinafter, specific examples of the polymer having the polymerizable group in the side chain thereof which is preferably used for the present invention will be described, but the present invention is not particularly limited to the compounds.

Ra and Rb each independently represent hydrogen or an alkyl group.

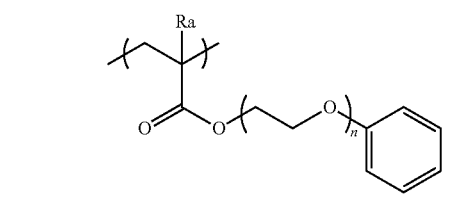

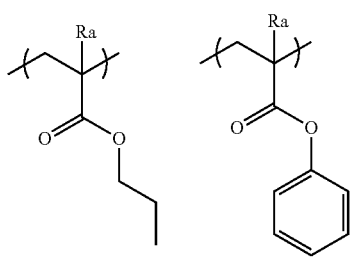

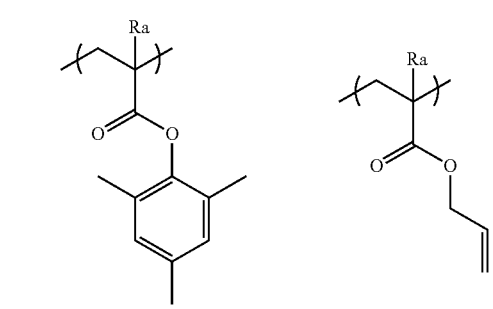

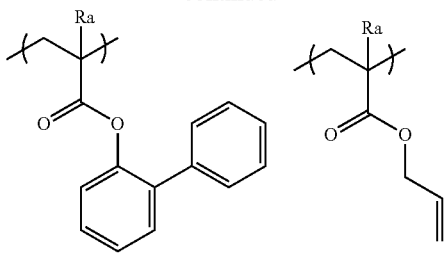

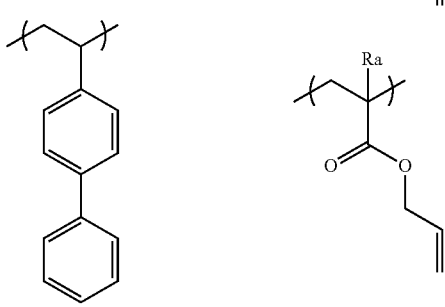

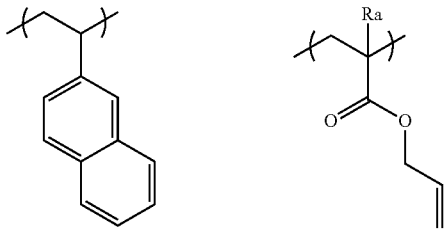

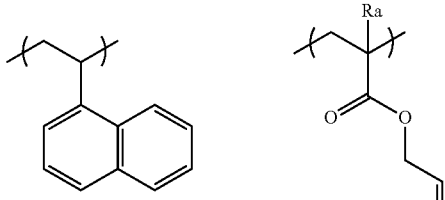

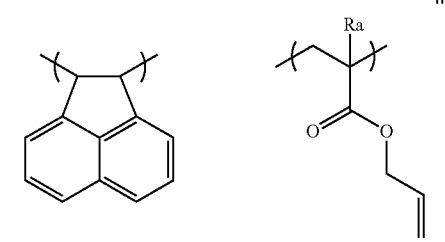

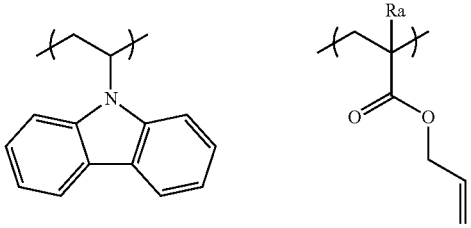

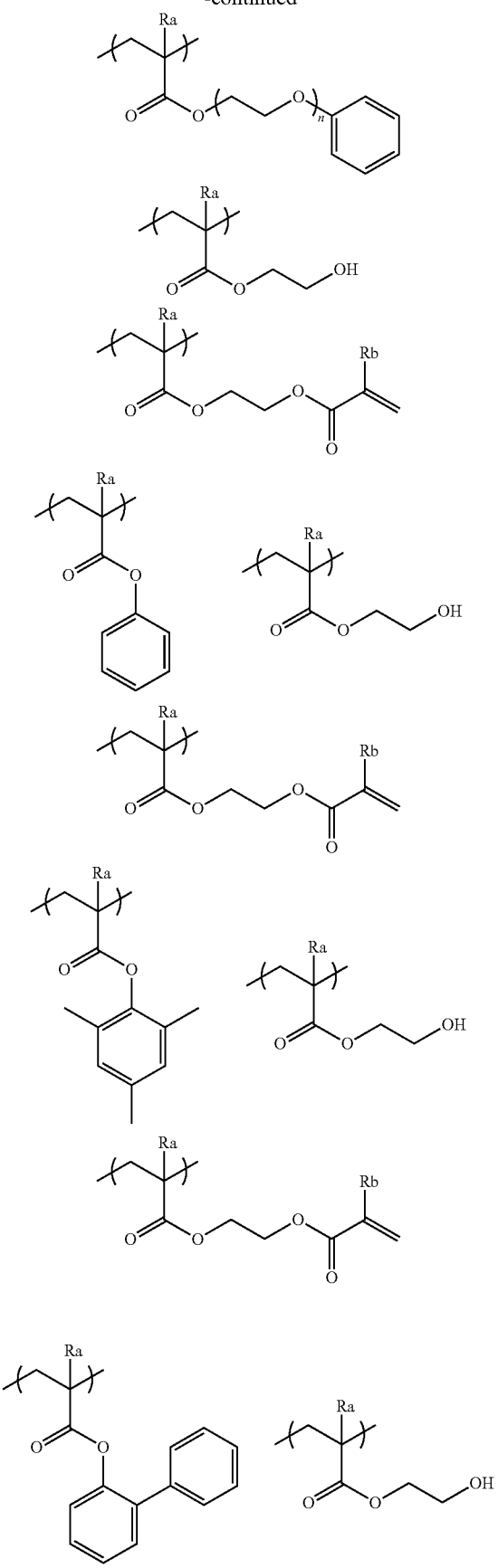

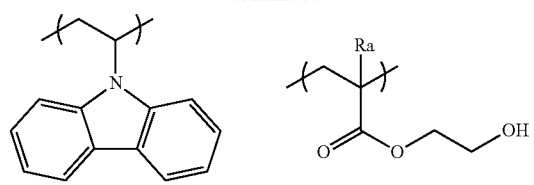
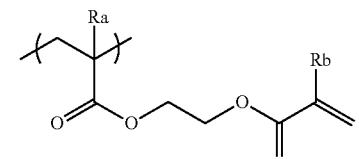
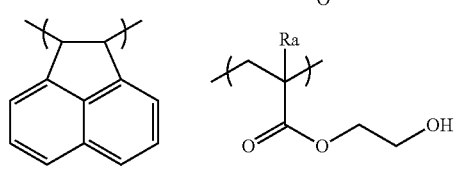
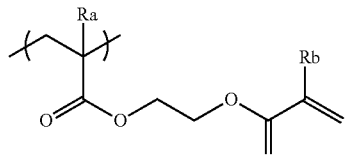
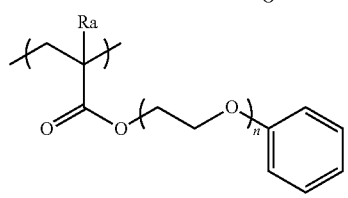
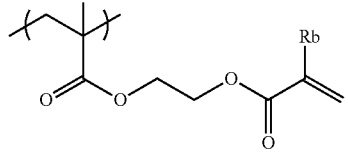
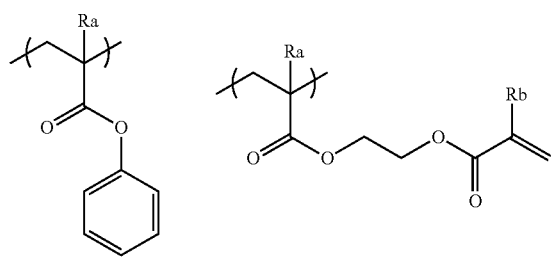
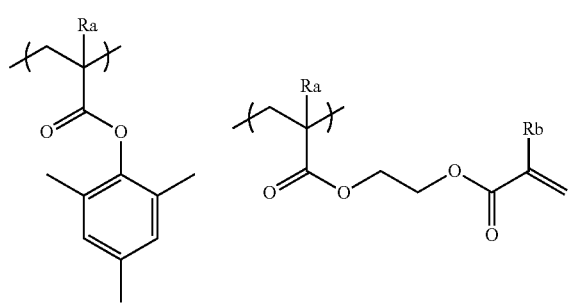
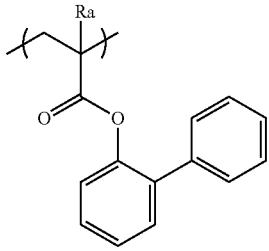
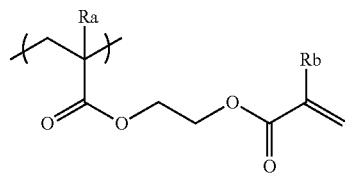
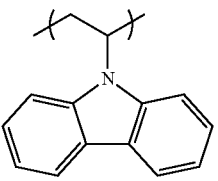
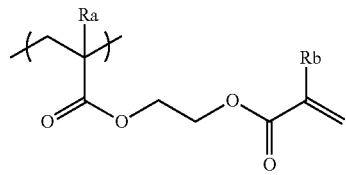
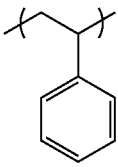
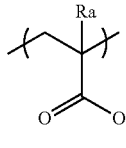
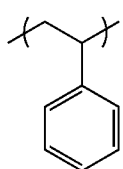
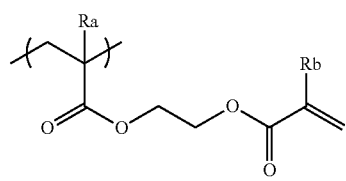
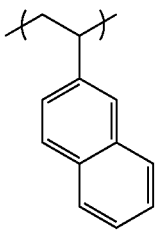

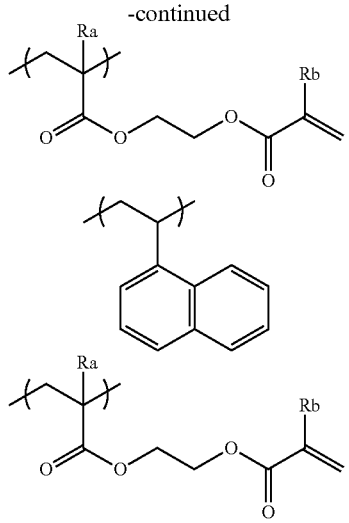

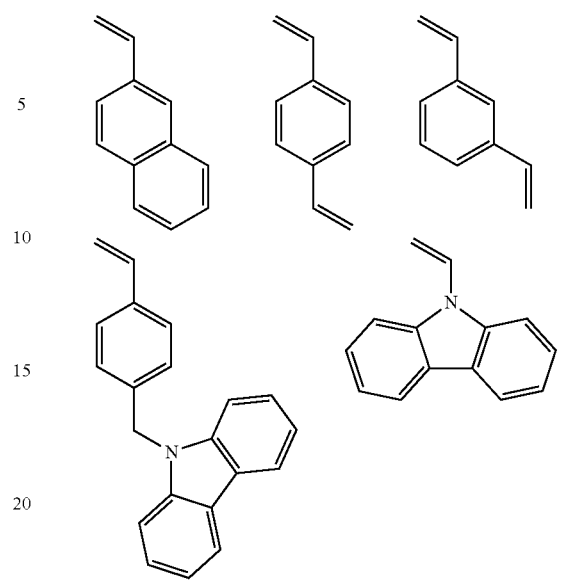

(Molecular Weight)

The molecular weight of the polymer having a polymerizable group of the present invention in the side chain thereof is preferably 1000 to 10000000, more preferably 5000 to 300000, and particularly preferably 10000 to 200000.

(Tg)

The glass transition temperature (hereinafter, also referred to as Tg) of the polymer having a polymerizable group of the present invention in the side chain thereof is preferably 50° C. to 400° C., more preferably 70° C. to 350° C., and particularly preferably 100° C. to 300° C.

In the curable resin composition of the present invention, the content ratio of the polymer having the polymerizable group in the side chain thereof is preferably 0.1% by mass to 50% by mass, more preferably 5% by mass to 45% by mass, and particularly preferably 15% by mass to 40% by mass with respect to the total amount of the curable resin composition (preferably, the total amount of the (meth)acrylate monomer, the non-conjugated vinylidene group-containing compound, the photo-radical polymerization initiator, the thermal radical polymerization initiator, and the polymer having the polymerizable group in the side chain thereof). It is preferable that the content ratio of the polymer having the polymerizable group in the side chain be 50% by mass or less with respect to the total amount of the curable resin composition, from a viewpoint of controlling the initial viscosity of the curable resin composition before photo-irradiation and/or heating to facilitate dispensation or the like.

<Other Additives>

In the present invention, the curable resin composition may contain additives such as a resin, monomer, dispersant, plasticizer, thermal stabilizer, release agent and others not satisfying the conditions of the present invention within the range not departing from the scope of the present invention.

For example, a non-(meth)acrylic monomer may be contained as a monomer component.

The addition amount of the non-(meth)acrylic monomer is preferably 0% by mass to 20% by mass and more preferably 0% by mass to 15% by mass with respect to the entire monomers.

The non-(meth)acrylic monomer is not particularly limited, but the compounds described below may be used.

[Method of Manufacturing Semi-Cured Product]

The method of manufacturing the semi-cured product of the present invention includes performing at least one of photo-irradiation or heating on the curable resin composition of the present invention and forming a semi-cured product having a complex viscosity of $10^5$ mPa·s to $10^8$ mPa·s at a frequency of 10 Hz at 25° C.

In addition, in a case where a step of the photo-polymerization on the curable resin composition of the present invention is included, it is preferable that the radical polymerization initiator further includes a photo-radical polymerization initiator.

Here, in the present specification, the term "semi-cured product" means a product which is obtained by polymerizing a curable resin composition, not completely solid, and in a state of having liquidity to some extent. For example, a polymer, to which photo-irradiation and/or heating is applied, of the curable resin composition having a complex viscosity of $10^5$ mPa·s to $10^8$ mPa·s at a frequency of 10 Hz at 25° C. is a semi-cured product. The present invention is not particularly limited, but it is considered that a product having an upper limit of the complex viscosity of 1.0 mPa·s to $10^9$ mPa·s at a frequency of 10 Hz at 25° C. is a semi-cured product. On the other hand, the term "cured product" is a product obtained by polymerizing curable resin composition in a state of a complete solid.

Hereinafter, the method of manufacturing a semi-cured product of the present invention and the method of manufacturing a cured product of the present invention will be described in detail with reference to preferred embodiments. In addition, since the method of manufacturing the cured product of the present invention includes the method of manufacturing the semi-cured product of the present invention, preferred embodiments of the manufacturing method common to both methods are described in the section of the method of manufacturing the semi-cured product of the present invention.

<Semi-Curing Step>

The method of manufacturing a semi-cured product of the present invention includes a step of performing photo-irradiation and/or heating on the curable resin composition to obtain a semi-cured product having a complex viscosity of $10^5$ mPa·s to $10^8$ mPa·s at a frequency of 10 Hz at 25° C.

In the method of manufacturing a semi-cured product of the present invention, the curable resin composition may be directly placed in a molding die to be used at the time of thermal polymerization in the method of manufacturing a cured product of the present invention described below, before photo-irradiation and/or heating of the composition, or alternatively, the curable resin composition may be placed in a die different from the molding die at the time of photo-irradiation and/or heating to manufacture a semi-cured product, and the photo-irradiated semi-cured product obtained in the method of manufacturing a cured product of the present invention described below may be moved into the molding die.

Here, the molding die is generally composed of two molding dies and is so designed that the content therein could be heated under pressure by the combination of the two molding dies. When a low-viscosity composition is injected into the molding die, the curable resin composition may leak out through the mold clearance. The curable resin composition used for the method of manufacturing a semi-cured product of the present invention generally has a low viscosity and therefore it is difficult to directly inject the composition into a molding die. Consequently, in one preferred embodiment of the method of manufacturing a semi-cured product of the present invention, a polymer having a polymerizable group in the side chain thereof is further added to the curable resin composition to control the viscosity of the composition as described above, and thermal polymerization described below and semi-curing through photo-irradiation and/or heating are performed in one molding die to obtain a cured product, which is preferable from the viewpoint of the productivity.

On the other hand, according to another preferred embodiment of the method of manufacturing a semi-cured product of the present invention, the curable resin composition is put into a die different from the molding die at the time of photo-irradiation and/or heating to manufacture a semi-cured product, and thereafter the semi-cured product to which the photo-irradiation and/or heating is applied, which is obtained in the method of manufacturing a cured product of the present invention described below is moved into the molding die, and this embodiment is preferred from the viewpoint of reducing the material cost.

In a case where a die different from the molding die is used, a die for preform is preferred. The die for preform may be formed of metal, or may be formed of glass or resin. In consideration of using the die repeatedly in a mass-production line, the die for preform is preferably formed of metal or glass. In a case where the semi-cured product of the present invention is used for lenses, it is preferable that at least one side of the die for preform has a shape that is the same as and/or similar to the shape of the molding die, and more preferably, both sides of the die have a shape that is the same as and/or similar to the shape of the molding die.

(Condition of Photo-Irradiation)

Preferred conditions of the photo-irradiation in the method of manufacturing a semi-cured product of the present invention will be described below.

Preferably, the photo-irradiation is carried out so that the semi-cured product after photo-irradiation preferably has a complex viscosity of $10^5$ mPa·s to $10^8$ mPa·s at a frequency of 10 Hz at 25° C., more preferably $10^5$ mPa·s to $10^{7.5}$ mPa·s, and particularly preferably $10^{5.5}$ mPa·s to $10^{7.5}$ mPa·s.

Light used for the photo-irradiation is preferably UV rays or visible rays, and more preferably UV rays. For example, a metal halide lamp, a low-pressure mercury lamp, a high-pressure mercury lamp, an ultra-high-pressure mercury lamp, a bactericidal lamp, a xenon lamp, an LED lamp, and the like are preferably used.

The atmosphere at the time of the photo-irradiation is preferably the air or substituted with an inert gas; and more preferably an atmosphere substituted with nitrogen to have an oxygen concentration of 1% or less.

(Condition for Semi-Curing by Heating)

Preferred conditions for thermal semi-curing in the production method for a semi-cured product of the invention are described below.

Preferably, the thermal semi-curing is attained so that the semi-cured product after heating could have a complex viscosity of $10^5$ mPa·s to $10^8$ mPa·s at 25° C. and at a frequency of 10 Hz, more preferably $10^5$ mPa·s to $10^{7.5}$ mPa·s, and particularly preferably $10^{5.5}$ mPa·s to $10^{7.5}$ mPa·s.

[Semi-Cured Product]

The semi-cured product of the present invention is manufactured according to the method of manufacturing a semi-cured product of the present invention. Such a semi-cured product can be preferably used in the method of manufacturing a cured product of the present invention described below.

Here, the preferred range of the complex viscosity of the semi-cured product of the present invention is the same as the preferred range of the complex viscosity of the semi-cured product in the method of manufacturing a semi-cured product of the present invention described above.

The semi-cured product of the present invention may not contain the photo-radical polymerization initiator at all after the photo-irradiation step since the initiator is completely consumed in the step, or the photo-radical polymerization initiator may remain in the semi-cured product.

(Tg)

The glass transition temperature (hereinafter, also referred to as Tg) of the semi-cured product of the present invention is preferably −150° C. to 0° C., more preferably −50° C. to 0° C., and particularly preferably −20° C. to 0° C.

[Method of Manufacturing Cured Product]

The method of manufacturing a cured product of the invention includes a step of performing at least one of photo-irradiation and heating on a curable resin composition containing a (meth)acrylate monomer, a non-conjugated vinylidene group-containing compound, and a thermal radical-polymerization initiator to obtain a semi-cured product having a complex viscosity of $10^5$ mPa·s to $10^8$ mPa·s at a frequency of 10 Hz at 25° C. (that is, the method of manufacturing a semi-cured product of the present invention), and a thermal polymerization step of putting the semi-cured product in a molding die for pressure deformation, and heating it therein for thermal polymerization to obtain a cured product (here, the non-conjugated vinylidene group-containing compound does not contain a (meth)acrylate monomer, and in a case where a step of photo-irradiation on the curable resin composition is included, the radical polymerization initiator further includes a photo-radical polymerization initiator).

Even in a case where the step of obtaining the semi-cured product does not include a step of photo-irradiating the curable resin composition, the radical polymerization initiator may further contain a photo-radical polymerization initiator.

It is preferable that the method of manufacturing a cured product of the present invention include a step of photo-irradiating the curable resin composition and the radical polymerization initiator be a photo-radical polymerization initiator.

<Thermal Polymerization Step>

The method of manufacturing a cured product of the present invention includes a thermal polymerization step of putting the semi-cured product in a molding die for pressure deformation, and heating it for thermal polymerization to obtain a cured product.

The molding die used for the method of manufacturing a cured product of the present invention is also referred to as a thermomolding mold. In general, it is preferable that heating be performed under pressure on the contents by combining two molding dies in the thermomolding mold. In the method of manufacturing a cured product of the present invention, it is preferable that a mold be used as the molding die in the thermal polymerization step to obtain the cured product. As such a thermomolding mold, a molding die which is described in, for example, JP-A-2009-126011 can be used.

(Introduction into Molding Die)

In the method of manufacturing a cured product of the present invention, first, the semi-cured product manufactured according to the method of manufacturing a semi-cured product of the invention described above is put into a molding die. Firstly, the step of putting the semi-cured product into the molding die will be described.

The semi-cured product after photo-irradiation and/or heating is directly placed in a thermomolding mold and is photo-irradiated and/or heated therein, or is placed in a die different from a thermomolding mold and is photo-irradiated and/or heated therein, as described in the section of the method of manufacturing a semi-cured product of the present invention. In the case where the semi-cured product after photo-irradiation is directly placed in a thermomolding mold and is photo-irradiated and/or heated therein, the operation of putting the semi-cured product into a thermomolding mold is unnecessary, and the semi-cured product is written to be put in a molding die merely for explanation.

On the other hand, in the case where the semi-cured product after photo-irradiation and/or heating is placed in a die different from a thermomolding mold and is photo-irradiated and/or heated therein, the operation means the step of moving the semi-cured product into a thermomolding mold. As the method of moving the semi-cured product after photo-irradiation and/or heating into a thermomolding mold, for example, air tweezers equipped with a syringe, a vacuum pad and a vacuum generator can be used. The semi-cured product of the present invention has a complex viscosity falling within a specific range, and therefore can be readily moved into a thermomolding mold by the use of such air tweezers.

(Pressure Deforming/Heating)

According to the method of manufacturing a cured product of the present invention, the semi-cured product put in a molding die is deformed under pressure and heated for thermal polymerization to obtain a cured product.

Here, pressure deforming and heating may be carried out simultaneously, or heating may be carried out after pressure deforming, or pressure deforming may be carried out after heating. Above all, preferably, pressure deforming and heating are carried out simultaneously. Also preferably, after simultaneous pressure deforming and heating, the product may be further heated at a higher temperature after the pressure applied thereto has become stable.

The pressure for the pressure deforming is preferably kg/cm² to 100 kg/cm², more preferably 3 kg/cm² to 50 kg/cm², and particularly preferably 3 kg/cm² to 30 kg/cm².

The heating temperature is preferably 80° C. to 300° C., more preferably 120° C. to 300° C., and particularly preferably 150° C. to 280° C. when the heating is carried out simultaneously with pressure deforming.

On the other hand, in the case where the product is further heated at a higher temperature after the pressure applied thereto has become stable, the heating temperature is preferably 80° C. to 300° C., more preferably 120° C. to 300° C., and particularly preferably 150° C. to 280° C.

The time of the thermal polymerization is preferably 30 seconds to 1000 seconds, more preferably 30 seconds to 500 seconds, and particularly preferably 60 seconds to 300 seconds.

The atmosphere at the time of the thermal polymerization is preferably air or substituted with an inert gas; and more preferably an atmosphere substituted with nitrogen to have an oxygen concentration of 1% or less.

[Cured Product]

The cured product of the present invention is manufactured according to the method of manufacturing a cured product of the present invention.

Preferred characteristics of the cured product of the present invention are described below.

(Refractive Index)

Preferably, the cured product of the present invention has a high refractive index from the viewpoint of using it for optical components, especially for lenses. The refractive index nD at a wavelength of 589 nm of the cured product of the present invention is preferably 1.45 or more, more preferably 1.50 or more, and particularly preferably 1.51 or more.

(Abbe's Number)

Preferably, the cured product of the present invention has a low Abbe's number from the viewpoint of reducing the chromatic aberration when used for optical components, especially for lenses. The Abbe's number at a wavelength of 589 nm of the cured product of the present invention is preferably less than 55, more preferably less than 50, particularly preferably less than 45, more particularly preferably less than 40, still more particularly preferably less than 35, and most preferably less than 30.

In the present specification, the Abbe's number vD is calculated according to the following expression (A) by measuring refractive indices nD, nF and nC at a wavelength of 589 nm, 486 nm, and 656 nm, respectively.

$$vD = \frac{nD - 1}{nF - nC} \qquad \text{Expression (A)}$$

(Size)

Preferably, the maximum thickness of the cured product of the present invention is 0.1 mm to 10 mm. The maximum thickness is more preferably 0.1 mm to 5 mm and particularly preferably 0.15 mm to 3 mm. Also preferably, the maximum diameter of the cured product of the present invention is 1 mm to 1000 mm. The maximum diameter is more preferably 2 mm to 50 mm and particularly preferably 2.5 mm to 10 mm. The cured product having the size as above is especially useful for optical components having a high refractive index. In general, it is not easy to produce such a thick molded article according to a solution casting method since the solvent is difficult to remove, or that is, since molding the product is not easy. However, according to the method of manufacturing a semi-cured product and the method of manufacturing a cured product of the present invention, it is easy to form such a thick molded article while preventing the generation of burrs, and therefore the yield of the products is high. The invention therefore realizes cured products having complicated shapes such as non-spherical shapes or the like. To that effect, according to the present invention, it is easy to produce cured products having high heat resistance.

[Optical Components]

Preferably, the cured product of the present invention is a molded article having a high refractive index, a high light transmittance, and light weight and excellent in optical characteristics, and the optical component of the present invention uses the cured product of the present invention. The type of the optical component is not particularly limited. In particular, the cured product of the invention is favorably used for optical components that utilize the excellent optical characteristics of curable resin compositions, especially for light-transmissive optical components (so-called passive optical components). Optically-functional devices equipped with such optical components include, for example, various types of display devices (liquid-crystal displays, plasma displays, etc.), various types of projector devices (OHP, liquid-crystal projectors, etc.), optical fiber communication devices (light waveguides, light amplifiers, and the like), imaging devices such as cameras, videos, and the like.

The passive optical components for use in optically-functional devices include, for example, lenses, prisms, prism sheets, panels (tabular molded articles), films, optical waveguides (filmy, fiber-like, and the like), optical discs, LED sealants, and the like. If desired, the passive optical components may have a multilayer structure, for example, by providing thereon a coating layer, such as a protective layer for preventing mechanical damage of the coating surface by friction or abrasion, a light-absorbing layer for absorbing the light having an undesirable wavelength to cause degradation of inorganic particles, substrates and others, a blocking layer for retarding or preventing permeation of reactive small molecules such as moisture, oxygen gas, and the like, an antiglare layer, an antireflection layer, a low-refractivity layer, and the like, as well as any other additional functional layer added thereto. Specific examples of the optional coating layers include a transparent conductive film and a gas-barrier layer formed of an inorganic oxide coating layer, a gas-barrier layer and a hard coat layer formed of an organic coating layer, and the like. The coating method for these layers may be any known coating method such as a vacuum evaporation method, a CVD method, a sputtering method, a dip coating method, a spin coating method, or the like.

Application Example

The optical component using the cured product of the present invention is especially favorable for lens substrates. The lens substrate manufactured using the curable resin composition of the present invention favorably has a low Abbe's number and additionally has the advantages of high refractivity, light transmittance, and light weight and is excellent in optical characteristics. Further, by suitably adjusting the type of the monomer constituting the curable resin composition, it is possible to arbitrary adjust the refractive index of the lens substrate.

In addition, in the present specification, the term "lens substrate" means a single component capable of exhibiting a lens function. Any film and component may be provided on and around the surface of the lens substrate in accordance with the service environment and the use of lenses. For example, there may be formed a protective film, an antireflection film, a hard coat film, or the like on the surface of the lens substrate. Further, it is also possible to allow the lens substrate to be intruded and fixed in a substrate holding frame. However, those films and frame are additional components to the lens substrate and therefore differ from the lens substrate itself referred to in the present specification.

In using the lens substrate for lenses, the lens substrate itself may be used as a lens by itself, or additional films or frames may be added thereto for use as a lens, as described above. The type and the shape of the lens using the lens substrate are not particularly limited.

Since the lens substrate has a low Abbe's number, the lens substrate can be preferably used for chromatic aberration correction lenses, and the chromatic aberration correction lenses are preferably used for, for example, imaging lenses such as a mobile phone, a digital camera, and the like; image projection lenses such as a TV, a video camera, and the like; on-board lenses; and lenses for an endoscope.

EXAMPLES

The characteristics of the present invention are described in detail with reference to the following Examples.

In the following Examples, materials, used amounts, ratios, the details of treatments, and the treatment procedures may be suitably modified within the range not departing from the scope of the present invention. Accordingly, the range of the present invention should not be limitatively interpreted by Examples described below.

Examples 1 to 15 and Comparative Examples 1 to 3

(1) Preparation of Materials Used for Curable Resin Composition

Firstly, the materials described below were prepared.

<Polyfunctional (meth) acrylic monomer>

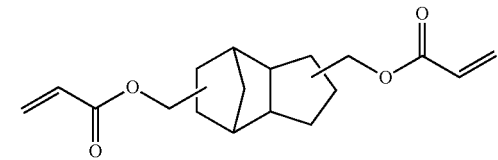

(Aa-1)

(Aa-2) m + n = 10
(Aa-3) m + n = 4

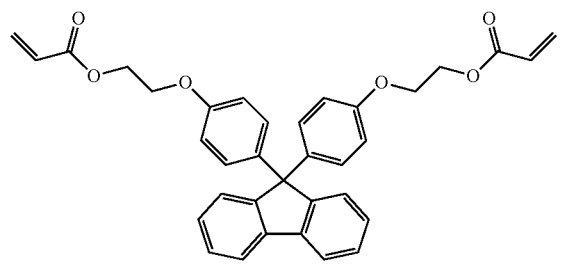

(Aa-4)

Aa-1: A-DCP (trade name, manufactured by Shin-Nakamura Chemical Co., Ltd.)

Aa-2: light acrylate BP-4EA (trade name, manufactured by KYOEISHA Chemical Co., Ltd.)

Aa-3: light acrylate BP-10EA (trade name, manufactured by KYOEISHA Chemical Co., Ltd.)

Aa-4: Synthesis was carried out by the following method.

The reaction described below was carried out in a nitrogen gas stream. 80.0 g of 9,9-bis[4-(2-hydroxyethoxy)phenyl] fluorene and 40.5 g of triethyl amine were allowed to be dissolved in 1000.0 g of tetrahydrofuran. The reacted solution was ice-cooled, the temperature thereof was maintained to be 10° C. or lower, and 36.2 g of acrylic acid chloride was added dropwise thereto. After the temperature thereof was returned to room temperature and the resultant was stirred for 2 hours. An aqueous sodium hydrogen carbonate solution was added to the reacted solution, and ethyl acetate was extracted therefrom. Organic layers were collected, MgSO$_4$ was added, the resultant was filtered and concentrated, and the concentrate was purified using column chromatography, thereby obtaining 89.6 g of Aa-4.

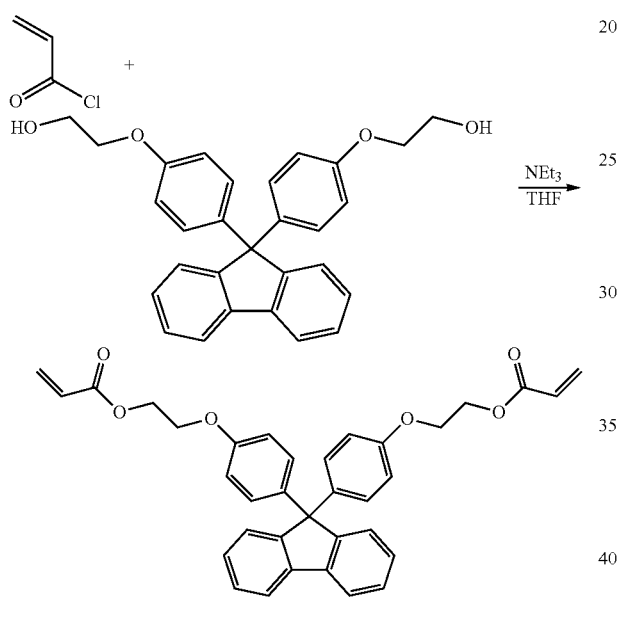

(Aa-4)

<Monofunctional (Meth)Acrylic Monomer>

Ab-1: acrylic acid dodecyl (trade name, manufactured by Tokyo Chemical Industry Co., Ltd.)

Ab-2: acrylic acid-2-phenoxyethyl (trade name, manufactured by Tokyo Chemical Industry Co., Ltd.)

Ab-3: ADMA (trade name, manufactured by Osaka Organic Chemical Industry)

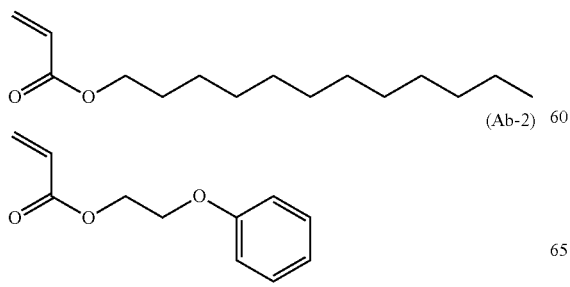

(Ab-1)

(Ab-2)

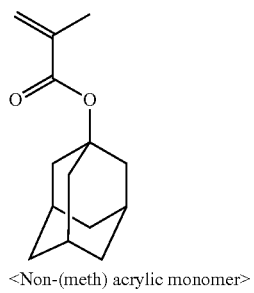

(Ab-3)

<Non-(meth) acrylic monomer>

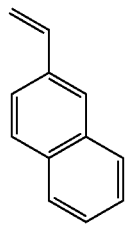

(Ac-1)

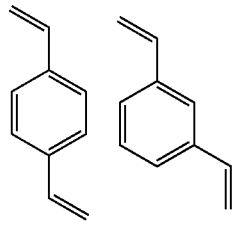

(Ac-2)

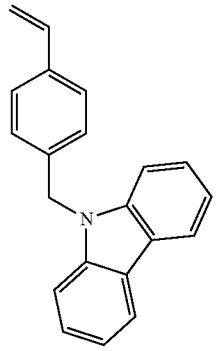

(Ac-3)

Ac-1: 2-Vinylnaphthalene (trade named, manufactured by Sigma-Aldrich Japan K.K.)

Ac-2: divinylbenzene (m-, p-mixture, trade name, manufactured by Tokyo Chemical Industry Co., Ltd.)

Ac-3: Synthesis was carried out according to EP1216995.

<Polymer Having Polymerizable Group in Side Chain Thereof>

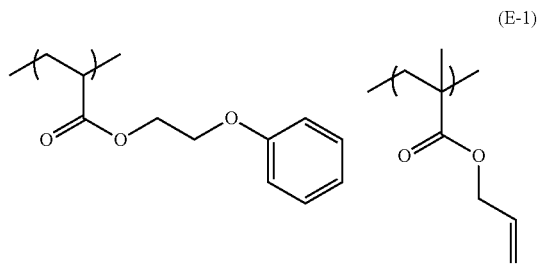

(E-1)

-continued

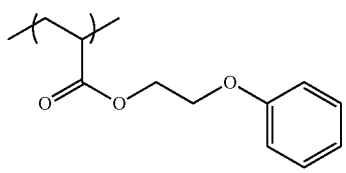

(E-2)

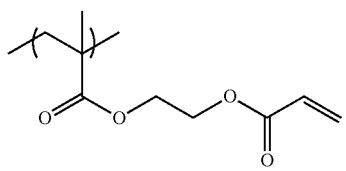

(E-3)

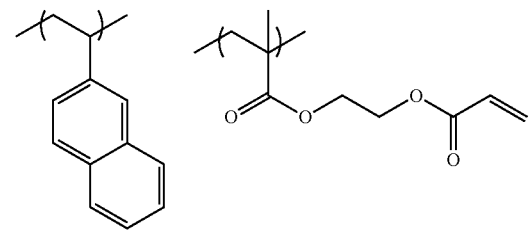

E-1: Synthesis was Carried Out by the Following Method.

The reaction described below was carried out in a nitrogen gas stream. 12.0 g of acrylic acid-2-phenoxyethyl and 18.0 g of allyl methacrylate (manufactured by Wako Pure Chemical Industries, Ltd.) were allowed to be dissolved in 172.3 g of methyl ethyl ketone, and then the solution was heated at 70° C. Subsequently, a solution in which 1.05 g of a polymerization initiator V-65 (manufactured by Wako Pure Chemical Industries, Ltd.) was dissolved in 12.0 g of methyl ethyl ketone was added dropwise thereto for 30 minutes. After the dropwise addition was completed, the resultant was further reacted at 70° C. for 4.5 hours. Next, the reacted solution was left to be cooled and concentrated to have a total amount of 107.7 g, and 42.0 g of ethanol was added thereto to be uniform. The reacted solution was added dropwise to 858.0 g of ethanol which was cooled to 5° C. or lower, and deposited powder was filtered and dried, thereby obtaining 20.5 g of a polymer (E-1). The weight average molecular weight of the obtained polymer was 45700 in terms of standard polystyrene according to a GPC method, and the dispersity (Mw/Mn) thereof was 4.15.

-continued

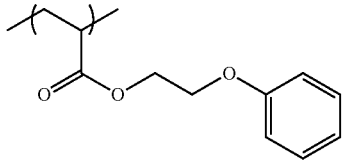 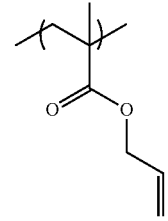

(E-1)

E-2: Synthesis was Carried Out by the Following Method.

The reaction described below was carried out in a nitrogen gas stream. 12.0 g of acrylic acid-2-phenoxyethyl and 18.0 g of methacrylic acid-2-hydroxyethyl (manufactured by Wako Pure Chemical Industries, Ltd.) were allowed to be dissolved in 101.2 g of methyl ethyl ketone, and then the solution was heated at 70° C. Subsequently, a solution in which 0.30 g of a polymerization initiator V-65 (manufactured by Wako Pure Chemical Industries, Ltd.) was dissolved in 20.0 g of methyl ethyl ketone was added dropwise thereto for 30 minutes. After the dropwise addition was completed, the resultant was further reacted at 70° C. for 4.5 hours. Next, the reacted solution was left to be cooled and added dropwise to 1061.0 g of methanol which was cooled to 5° C. or lower, and deposited powder was filtered and dried, thereby obtaining 17.5 g of a polymer (E-2)'. 12.0 g of the obtained (E-2)' and 10.02 g of triethylamine were allowed to be dissolved in 45.0 g of dimethylacetamide. The reacted solution was ice-cooled, the temperature thereof was maintained to be 10° C. or lower, and 12.6 g of acrylic acid chloride was added dropwise thereto. After the temperature thereof was returned to room temperature and the resultant was reacted at 50° C. for hours. After the temperature was returned to room temperature, 1.0 N of hydrochloric acid water was added thereto, and ethyl acetate was extracted therefrom. Subsequently, the resultant was washed with an aqueous sodium hydrogen carbonate solution, organic layers were collected, MgSO$_4$ was added, the resultant was filtered, concentrated, and added dropwise to 300 g of a mixed solution of methanol and water with a volume ratio of 9 to 1 which was cooled to 5° C. or lower, and then deposited powder was filtered and dried, thereby obtaining 9.6 g of a polymer (E-2). The weight average molecular weight of the obtained polymer was 52500 in terms of standard polystyrene according to the GPC method, and the dispersity (Mw/Mn) thereof was 2.10.

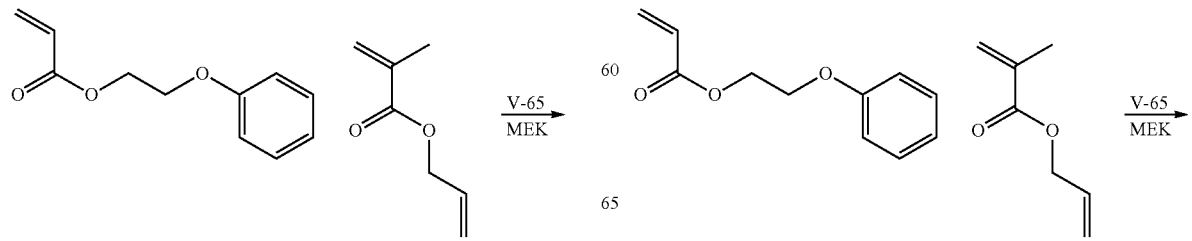

-continued

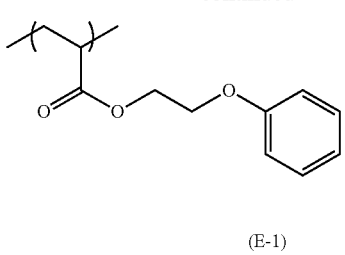
(E-1)

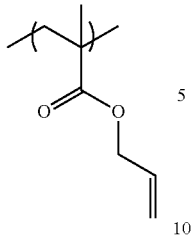

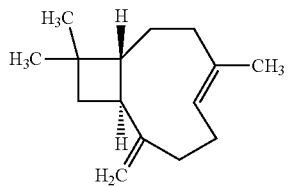
(B-5)

E-3: E-3 was synthesized in the same manner as that of the method of synthesizing E-2 except that 2-vinylnaphthalene was used instead of acrylic acid-2-phenoxyethyl. The weight average molecular weight of the obtained polymer was 38500 in terms of standard polystyrene according to the GPC method, and the dispersity (Mw/Mn) thereof was 2.10.

<Non-Conjugated Vinylidene Group-Containing Compound>

Non-conjugated vinylidene group-containing compounds used in Examples below are described, and the optical isomer can be used without limitation.

B-2: (+)-Aromadendrene (trade name, manufactured by Sigma-Aldrich Japan K.K.)

B-3: (+)-Longifolene (trade name, manufactured by Sigma-Aldrich Japan K.K.)

B-4: (+)-Limonene (trade name, manufactured by Tokyo Chemical Industry Co., Ltd.)

B-5: β-caryophyllene (trade name, manufactured by Tokyo Chemical Industry Co., Ltd.)

<Photo-Radical Initiator>

F-1: Irgacure 184 (trade name, manufactured by BASF Corporation)

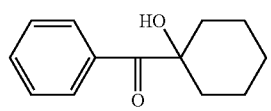
(F-1)

<Thermal Radical Polymerization Initiator>

F-2: Perbutyl O (trade name, manufactured by NOF Corporation)

F-3: Percumyl H (trade name, manufactured by NOF Corporation)

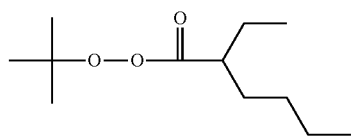
(F-2)

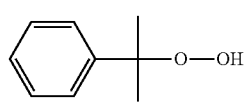
(F-3)

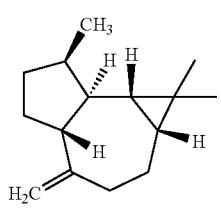
(B-2)

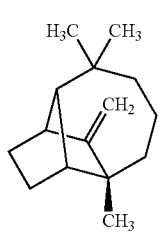
(B-3)

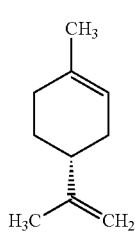
(B-4)

(2) Preparation of Curable Resin Composition

The above-described respective components were added so as to have the composition listed in Table 1, and the resultant was stirred to be uniform, and then a curable resin composition was prepared. In addition, in Comparative Example 3, monomer materials used in Example 4 disclosed in JP-A-2011-53518 were used.

(3) Evaluation (Evaluation (i) of Mold Resin Clearance Leakage)

A thermomolding mold for forming lenses having a diameter of 4.0 mm with an upper die part (top die part), a body die part, and a lower die part (bottom die part), was used here. The top die part was removed from the mold, and 10 mg of the curable resin composition was injected into the die. Thus the injected curable resin composition was irradiated with UV rays at 15 mW/cm² for the period of time listed in the following Table using Execure 3000 (manufactured by HOYA Co., Ltd.), thereby preparing a semi-cured product on the thermomolding mold. Next, the semi-cured product was fixed with the top die part put thereon, and in that condition, the thermoforming mold with the semi-cured product held therein was heated at 80° C., and further heated up to 200° C. while a pressure of 30 kgf/cm² was applied to the semi-cured product, and thereafter the temperature was cooled to room temperature.

In the process from injecting the curable resin composition into the thermomolding mold to cooling it to room temperature, the weight of the resin having leaked through the thermomolding mold clearance (gap formed between the body die part and the upper and lower die parts) was measured, and the resin composition was evaluated according to the following criteria.

B: The resin leakage was less than 0.1 mg.
C: The resin leakage was from 0.1 mg to less than 0.2 mg.
D: The resin leakage was 0.2 mg or more, and the level is problematic in practical use.

The obtained results are listed in the following Table 1.

(Evaluation (ii) of Mold Resin Clearance Leakage)

10 mg of the curable resin composition injected into a columnar transparent preform die having a diameter of 4 mm and a height of 1.5 mm was irradiated with UV rays at 15 mW/cm$^2$ for the period of time listed in the following Table, using Execure 3000 (manufactured by HOYA Co., Ltd.), thereby forming a semi-cured product. Next, the semi-cured product having the shape of the preform was transferred from the preform mold to the thermomolding mold used in the "evaluation (i) of mold resin clearance leakage", using air tweezers. After being heated at 80° C., this was further heated up to 200° C. while a pressure of 30 kgf/cm$^2$ was applied to the semi-cured product, and then cooled to room temperature.

In the process of transferring the semi-cured product to the thermomolding mold to cooling it to room temperature, the length of the burrs generated by leakage of the resin through the thermomolding mold clearance was measured, and the resin composition was evaluated according to the following criteria.

B: The resin leakage was less than 0.1 mg.
C: The resin leakage was from 0.1 mg to less than 0.2 mg.
D: The resin leakage was 0.2 mg or more, and the level is problematic in practical use.

The obtained results are listed in the following Table. Further, the evaluation (ii) of the mold resin clearance leakage is different from the evaluation (i) of mold resin clearance leakage in that a process of transferring the semi-cured product from the preform mold to the thermomolding mold is added, which is a strict condition as the leakage evaluation.

(Evaluation of Lens Moldability)

The same process as that for the "evaluation (ii) of mold resin clearance leakage" was repeated 10 times, and the appearance of each prepared lens was evaluated using Keyence's Digital Microscope (trade name: VHX-1000).

Those with fine unevenness (wrinkles) on the surface of the flange part of each lens, and those with cracks were considered as defective products; and those with neither wrinkles nor cracks were considered as non-defective products. Ten lenses were evaluated, and of those, the rate of non-defective products was referred to as a yield. The resin composition was evaluated according to the following criteria.

A: The yield was 90% or more.
B: The yield was 80% or more.
C: The yield was 30% or more
D: The yield was less than 30%.

(Refractive Index and Abbe's Number)

The curable resin composition was injected into a transparent glass die having a diameter of 10 mm and a thickness of 1 mm, and irradiated with UV rays at 15 mW/cm$^2$ for the period of time listed in the following Table using Execure 3000 (manufactured by HOYA Co., Ltd.), thereby obtaining a semi-cured product.

Next, the semi-cured product was heated at 200° C. for 5 minutes using a hot plate, thereby obtaining a thermally cured product. The refractive index at 589 nm and the Abbe's number of the obtained thermally cured product were measured using Abbe Meter (manufactured by Atago Co., Ltd.) and were set to the refractive index and the Abbe's number of the obtained cured product.

The obtained results are listed in the following Table 1.

<Heat Coloration Resistance>

The curable resin composition was injected into a transparent glass die having a diameter of 10 mm and a thickness of 1 mm, and irradiated with UV rays at 15 mW/cm$^2$ for the period of time listed in the following Table using Execure 3000 (manufactured by HOYA Co., Ltd.), thereby obtaining a semi-cured product.

Next, the obtained semi-cured product was heated at 200° C. for 5 minutes using a hot plate to obtain a thermally cured product. The obtained thermally cured product was heated in an oven at 150° C. for 500 hours, the change of transmittance (UV-visible spectrometer (UV-1650PC manufactured by Shimadzu Corp.)) at 400 nm before and after the heating was acquired and evaluated by the following criteria.

A: The change in transmittance was less than 5%.
B: The change in transmittance was less than 10%.
C: The change in transmittance was less than 15%.
D: The change in transmittance was 15% or more.

The obtained results are listed in the following Table 1.

TABLE 1

| | | | Comparative Example 1 | Comparative Example 2 | Comparative Example 3 | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 |
|---|---|---|---|---|---|---|---|---|---|---|---|---|---|---|---|---|---|---|---|---|
| Content ratio X1 (% by mass) of aromatic rings with respect to entire monomers | | | 0% | 15% | 20% | 15% | 20% | 25% | 35% | 51% | 51% | 51% | 51% | 51% | 52% | 52% | 57% | 52% | 52% | 52% |
| Content ratio X2 (% by mass) of aromatic rings with respect to entire (meth)acrylic monomers | | | 0% | 15% | 11% | 15% | 20% | 25% | 35% | 51% | 51% | 51% | 51% | 51% | 52% | 52% | 53% | 51% | 52% | 52% |
| Polyfunctional (meth)acrylic monomer (type, content ratio of aromatic rings) | Aa-1 | 0.0% | 68.8 | 25.0 | | 22.5 | | | | | | | | | | | | | | |
| | Aa-2 | 19.6% | | 25.0 | | 22.5 | 45.0 | 22.5 | | | | | | | | | | | | |
| | Aa-3 | 29.7% | | | | | | 22.5 | | 65.0 | 65.0 | 65.0 | 65.0 | 65.0 | 82.8 | 60.0 | 60.0 | 50.0 | 60.0 | 60.0 |
| | Aa-4 | 55.7% | | | 17.6 | | | | 45.0 | | | | | | | | | | | |
| Monofunctional (meth)acrylic monomer (type, content ratio of aromatic rings) | Ab-1 | 0.0% | 22.9 | 25.0 | | 22.5 | 22.5 | 45.0 | 45.0 | 25.0 | 25.0 | 25.0 | 25.0 | 25.0 | 22.7 | 20.0 | 10.0 | 20.0 | 20.0 | 20.0 |
| | Ab-2 | 40.1% | | | 70.7 | | | | | | | | | | | | | | | |
| | Ab-3 | 0.0% | | | | | | | | | | | | | | | | | | |
| Non-(meth)acrylic monomer (not satisfying general formula (1)) [type, content ratio of aromatic rings] | Ac-1 | 82.5% | | | | | | | | | | | | | | | 10.0 | 10.0 | | |
| | Ac-2 | 58.5% | | | 11.7 | | | | | | | | | | | | | | | |
| | Ac-3 | 85.5% | | | | | | | | | | | | | | | | | | |
| Polyfunctional (meth)acrylic monomer/entire (meth)acrylic monomers | | | 75.0 | 50.0 | 19.9 | 50.0 | 50.0 | 50.0 | 50.0 | 72.2 | 72.2 | 72.2 | 72.2 | 72.2 | 73.5 | 75.0 | 85.7 | 71.4 | 75.0 | 75.0 |
| Polymer having polymerizable group in side chain thereof (not satisfying general formula (1)) | E-1 | | | | | | | | | | | | | | 4.5 | 10 | 10 | 10 | | |
| | E-2 | | | | | 10.0 | 10.0 | 10.0 | 10.0 | 10.0 | 10.0 | | | | | | | | | |
| Non-conjugated vinylidene group-containing compound (general formula (1) is satisfied and free from alkenyl group) | B-2 | | | | | | | | | | | 10.0 | | | | | | | | |
| | B-3 | | | | | | | | | | | | 10.0 | | | | | | | | |
| Non-conjugated vinylidene group-containing compound (general formula (1) is satisfied and alkenyl group is contained) | B-4 | | 4.6 | | | | | | | | | | | 10.0 | 10.0 | 10.0 | 10.0 | 10.0 | 10.0 | 10.0 |
| | B-5 | | | | | | | | | | | | | | | | | | 10 | |

TABLE 1-continued

| | | | | | | | | | | | | | | | | | | |
|---|---|---|---|---|---|---|---|---|---|---|---|---|---|---|---|---|---|---|
| Photo-radical initiator | F-1 (IRGACURE 184) | 0.1 | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Thermal radical Initiator | F-2 (perbutyl O) | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| | F-3 (percumyl H) | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Conditions of photo-polymerization | Time of UV irradiation (sec) | 150 | 150 | 150 | 150 | 150 | 150 | 150 | 150 | 150 | 150 | 150 | 150 | 150 | 150 | 150 | 150 | 150 |
| Evaluations | Mold resin clearance (i) | D | D | D | B | B | B | B | A | A | A | A | A | A | A | A | A | A |
| | leakage (ii) | D | D | D | C | C | C | C | C | C | C | C | C | B | A | A | A | A |
| | Evaluation of lens moldability | D | D | D | B | B | B | B | B | B | B | A | A | A | A | A | A | A |
| | Refractive Index | 1.53 | 1.55 | 1.67 | 1.54 | 1.55 | 1.56 | 1.59 | 1.60 | 1.60 | 14.60 | 1.60 | 1.60 | 1.60 | 1.60 | 1.61 | 1.60 | 1.60 | 1.60 |
| | Abbe's number | 56.0 | 45.8 | 43.1 | 46.9 | 38.9 | 36.5 | 31.5 | 31.0 | 29.0 | 29.0 | 29.0 | 29.0 | 29.0 | 29.0 | 28.0 | 28.5 | 29.0 | 28.5 |
| | Heat coloration resistance | C | D | B | C | C | B | B | B | A | A | A | A | A | A | A | A | A | A |

From Table 1 above, it was understood that the cured product manufactured using the curable resin composition of the present invention was prevented from generating burrs at the time of molding, had a high yield after molding, excellent heat coloration resistance, and a low Abbe's number.

On the other hand, the cured product manufactured using the curable resin composition of Comparative Example 1 using the (meth)acrylate monomer with no aromatic ring had burrs generated at the time of molding, a low yield after molding, and a high Abbe's number.

The cured product manufactured using the curable resin composition of Comparative Example 2 with no non-conjugated vinylidene group-containing compounds other than the (meth)acrylate monomer had burrs generated at the time of molding, a low yield after molding, and degraded heat coloration resistance.

In the same manner, the cured product manufactured using the curable resin composition of Comparative Example 3, which had no non-conjugated vinylidene group-containing compounds other than the (meth)acrylate monomer and was used in Example 4 disclosed in JP-A-2011-53518, had burrs generated at the time of molding and a low yield after molding.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/057394, filed Mar. 15, 2013, and Japanese Application No. 2012-078046, filed Mar. 29, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A curable resin composition comprising a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer:

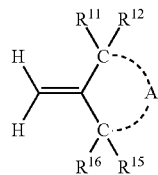

General Formula (1)

wherein:
$R^{11}$, $R^{12}$, $R^{15}$, and $R^{16}$ each independently represents a substituent and A represents an atomic group necessary for forming a cyclic structure; and the content ratio of aromatic rings with respect to entire monomers contained in the curable resin composition that is represented by the following formula (I) is 25% by mass or more, $$X^1 = \sum_{k=1}^{n^1} (x_k^1 \times y_k^1) \qquad \text{Formula (I)}$$

wherein $X^1$ represents the content ratio of aromatic rings with respect to the entire monomers contained in the curable resin composition, $x^1_k$ represents a mass content ratio of aromatic rings of each monomer species contained in the curable resin composition calculated by the following formula (I'), $y^1_k$ represents a mass ratio of each monomer species contained in the curable resin composition with respect to the total mass of the entire monomers contained in the curable resin composition, and $n^1$ represents the number of monomer species contained in the curable resin composition, $x^1_k$=(Molecular weight of aromatic ring moiety contained in a monomer species)/(Molecular weight of the monomer species)×100% wherein $x^1_k$ represents a content ratio of aromatic rings of the monomer species.

2. The curable resin composition according to claim 1, wherein the content ratio of aromatic rings represented by the formula (I) is 30% by mass or more.

3. The curable resin composition according to claim 1, wherein a content ratio $X^2$ of aromatic rings with respect to the entire (meth)acrylic monomers contained in the curable resin composition that is represented by the following formula (II) is 25% by mass or more, $$X^2 = \sum_{k=1}^{n^2} (x_k^2 \times y_k^2) \qquad \text{Formula (II)}$$

wherein $X^2$ represents a content ratio of aromatic rings with respect to the entire (meth)acrylic monomers, $x^2_k$ represents a mass content ratio of aromatic rings of each (meth)acrylate monomer species calculated by the following formula (II'), $y^2_k$ represents a mass ratio of each (meth)acrylate monomer species with respect to the total mass of the entire (meth)acrylate monomers, and $n^2$ represents the total number of (meth)acrylic monomer species contained in the curable resin composition, $X^2_k$=(Molecular weight of aromatic ring moiety contained in a (meth)acrylate monomer species)/ (Molecular weight of the (meth)acrylate monomer species)×100%   Formula (II')

wherein $x^2_k$ represents the content ratio of aromatic rings of the (meth)acrylate monomer species.

4. The curable resin composition according to claim 1, wherein the (meth)acrylate monomer having an aromatic ring is represented by the following general formula (2), General Formula (2)

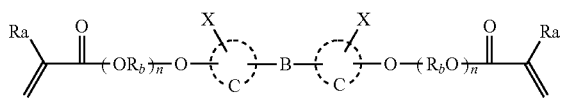

wherein rings C each independently represent an aromatic ring having 6 to 14 carbon atoms, Ra's each independently represent a hydrogen atom or an alkyl group, Rb's each independently represent an alkylene group, and X represents a hydrogen atom or a substituent, B represents a difunctional group represented by single bond,

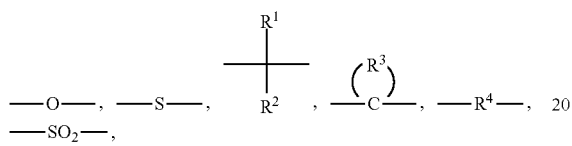

$R^1$ and $R^2$ each independently represent a hydrogen atom, a methyl group, an ethyl group, a phenyl group, or a diphenyl group, $R^3$ represents an alkylene group, a cycloalkylene group, or a diphenyl group which have 3 to 24 carbon atoms, $R^4$ represents an alkylene group or a cycloalkylene group which have 1 to 12 carbon atoms, and n's each independently represent an integer of 0 to 14.

5. The curable resin composition according to claim 1, wherein:
the (meth)acrylate monomers having an aromatic ring include polyfunctional (meth)acrylate monomers and monofunctional (meth)acrylate monomers, and
the (meth)acrylate monomers having an aromatic ring contain 40% by mass to 90% by mass of the polyfunctional (meth)acrylate monomers with respect to the total mass of the polyfunctional (meth)acrylate monomers and the monofunctional (meth)acrylate monomers contained in the curable resin composition.

6. The curable resin composition according to claim 4, wherein the B is represented by

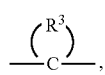

wherein $R^3$ represents an alkylene group, a cycloalkylene group, or a diphenyl group which have 3 to 12 carbon atoms.

7. The curable resin composition according to claim 1, wherein the content of the non-conjugated vinylidene group-containing compound with respect to the curable resin composition is 0.5% by mass to 30% by mass.

8. The curable resin composition according to claim 1, wherein the non-conjugated vinylidene group-containing compound includes an alkenyl group in addition to a vinylidene group.

9. The curable resin composition according to claim 1, further comprising a polymer having a polymerizable group in a side chain thereof.

10. The curable resin composition according to claim 9, wherein the polymer having a polymerizable group in the side chain thereof is contained in an amount of 5% by mass to 50% by mass with respect to the total mass of the curable resin composition.

11. The curable resin composition according to claim 1, comprising a photo-radical polymerization initiator.

12. The curable resin composition according to claim 1, comprising both a thermal radical polymerization initiator and a photo-radical polymerization initiator.

13. A method of manufacturing a semi-cured product, comprising subjecting a curable resin composition to at least one of photo-irradiation and heating to form a semi-cured product having a complex viscosity of $10^5$ mPa·s to $10^8$ mPa·s at a frequency of 10 Hz at 25° C., wherein:
the curable resin composition comprises a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer:

General Formula (1)

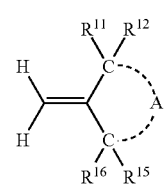

wherein:
$R^{11}$, $R^{12}$, $R^{15}$, and $R^{16}$ each independently represents a substituent and A represents an atomic group necessary for forming a cyclic structure; and
the content ratio of aromatic rings with respect to entire monomers contained in the curable resin composition that is represented by the following formula (I) is 25% by mass or more, $$X^1 = \sum_{k=1}^{n^1} (x^1_k \times y^1_k)$$

Formula (I)

wherein $X^1$ represents the content ratio of aromatic rings with respect to the entire monomers contained in the curable resin composition, $x^1_k$ represents a mass content ratio of aromatic rings of each monomer species contained in the curable resin composition calculated by the following formula (I'), $y^1_k$ represents a mass ratio of each monomer species contained in the curable resin composition with respect to the total mass of the entire monomers contained in the curable resin composition, and $n^1$ represents the number of monomer species contained in the curable resin composition, $x^1_k$=Molecular weight of aromatic ring moiety contained in a monomer species)/(Molecular weight of the monomer species)×100% wherein $x^1_k$ represents a content ratio of aromatic rings of the monomer species.

14. The method of manufacturing a semi-cured product according to claim 13, comprising subjecting a curable resin composition comprising a photo-radical polymerization initiator to photo-irradiation.

15. A semi-cured product which is manufactured by subjecting a curable resin composition to at least one of photo-irradiation and heating, wherein the curable resin composition comprises a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer:

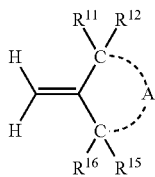

General Formula (1)

wherein:
$R^{11}$, $R^{12}$, $R^{15}$, and $R^{16}$ each independently represents a substituent and A represents an atomic group necessary for forming a cyclic structure; and
the content ratio of aromatic rings with respect to entire monomers contained in the curable resin composition that is represented by the following formula (I) is 25% by mass or more, $$X^1 = \sum_{k=1}^{n^1} (x_k^1 \times y_k^1)$$

Formula (I)

wherein $X^1$ represents the content ratio of aromatic rings with respect to the entire monomers contained in the curable resin composition, $x^1_k$ represents a mass content ratio of aromatic rings of each monomer species contained in the curable resin composition calculated by the following formula (I'), $y^1_k$ represents a mass ratio of each monomer species contained in the curable resin composition with respect to the total mass of the entire monomers contained in the curable resin composition, and $n^1$ represents the number of monomer species contained in the curable resin composition, $x^1_k$=Molecular weight of aromatic ring moiety contained in a monomer species)/(Molecular weight of the monomer species)×100% wherein $x^1_k$ represents a content ratio of aromatic rings of the monomer species.

16. A method of manufacturing a cured product, comprising subjecting a curable resin composition to at least one of photo-irradiation and heating, pressing and deforming the semi-cured product by putting the semi-cured product in a molding die and performing heating and thermal polymerization on the semi-cured product to obtain a cured product, wherein the curable resin composition comprises a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer:

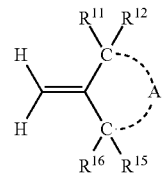

General Formula (1)

wherein $R^{11}$, $R^{12}$, $R^{15}$, and $R^{16}$ each independently represent a substituent and A represents an atomic group necessary for forming a cyclic structure.

17. A cured product produced by subjecting a curable resin composition to at least one of photo-irradiation and heating, pressing and deforming the semi-cured product by putting the semi-cured product in a molding die, and performing heating and thermal polymerization on the semi-cured product to obtain a cured product, wherein the curable resin composition comprises a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer:

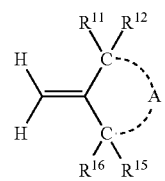

General Formula (1)

wherein $R^{11}$, $R^{12}$, $R^{15}$, and $R^{16}$ each independently represent a substituent and A represents an atomic group necessary for forming a cyclic structure.

18. An optical component using a cured product produced by subjecting a curable resin composition to at least one of photo-irradiation and heating, pressing and deforming the semi-cured product by putting the semi-cured product in a molding die, and performing heating and thermal polymerization on the semi-cured product to obtain a cured product, wherein the curable resin composition comprises a (meth)acrylate monomer having an aromatic ring, a non-conjugated vinylidene group-containing compound represented by the general formula (1) below, and a thermal or a photo-radical polymerization initiator, provided that the non-conjugated vinylidene group-containing compound is free from a (meth)acrylate monomer:

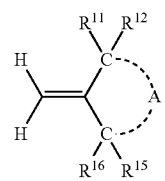

General Formula (1)

wherein $R^{11}$, $R^{12}$, $R^{15}$, and $R^{16}$ each independently represent a substituent and A represents an atomic group necessary for forming a cyclic structure.

* * * * *